US012464328B2

(12) United States Patent
Cohen et al.

(10) Patent No.: US 12,464,328 B2
(45) Date of Patent: Nov. 4, 2025

(54) SYSTEMS AND METHODS FOR LOCATING MOBILE DEVICES WITHIN A VEHICLE

(71) Applicant: Apple Inc., Cupertino, CA (US)

(72) Inventors: Sawyer I. Cohen, Menlo Park, CA (US); Jack J. Wanderman, San Francisco, CA (US); Romain A. Teil, San Francisco, CA (US); Scott M. Herz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 18/310,451

(22) Filed: May 1, 2023

(65) Prior Publication Data

US 2023/0269565 A1 Aug. 24, 2023

Related U.S. Application Data

(63) Continuation of application No. 17/315,095, filed on May 7, 2021, now Pat. No. 11,678,155, which is a continuation of application No. 16/779,195, filed on Jan. 31, 2020, now Pat. No. 11,006,257, which is a continuation of application No. 15/705,149, filed on Sep. 14, 2017, now Pat. No. 10,555,133.

(60) Provisional application No. 62/398,463, filed on Sep. 22, 2016.

(51) Int. Cl.
*H04W 4/40* (2018.01)
*H04W 4/02* (2018.01)

(52) U.S. Cl.
CPC .............. *H04W 4/40* (2018.02); *H04W 4/026* (2013.01)

(58) Field of Classification Search
None
See application file for complete search history.

(56) References Cited

U.S. PATENT DOCUMENTS

| | | | |
|---|---|---|---|
| 6,873,931 B1 | 3/2005 | Nower et al. | |
| 9,666,005 B2 | 5/2017 | Ellis et al. | |
| 10,555,133 B1 | 2/2020 | Cohen et al. | |
| 11,006,257 B2 | 5/2021 | Cohen et al. | |
| 2009/0132248 A1 | 5/2009 | Nongpiur | |
| 2011/0182445 A1 | 7/2011 | Atsmon et al. | |
| 2011/0281564 A1 | 11/2011 | Armitage et al. | |
| 2014/0256303 A1 | 9/2014 | Jones | |
| 2014/0355384 A1 | 12/2014 | Workman | |
| 2015/0210287 A1 | 7/2015 | Penilla et al. | |
| 2016/0065709 A1 | 3/2016 | Lee et al. | |
| 2016/0065710 A1 | 3/2016 | Lee et al. | |
| 2016/0234659 A1* | 8/2016 | Luo | H04W 4/026 |

(Continued)

*Primary Examiner* — Frantz Bataille
(74) *Attorney, Agent, or Firm* — Robert C. Kowert; Kowert, Hood, Munyon, Rankin & Goetzel, P.C.

(57) ABSTRACT

A method includes receiving, by sensors inside an enclosure of a vehicle, signals generated by signal generators in the enclosure of the vehicle. One of the sensors or signal generators may be part of a mobile device inside the enclosure. The method also includes determining a location and orientation of the mobile device from the signals. The method further includes determining, based on the location and orientation of the mobile device, an object in the enclosure that the mobile device is pointing to. The mobile device further includes transmitting a message to the mobile device in response to determining that the mobile device is pointing to the object, so as to cause the mobile device to display a user interface to allow the mobile device to control the object.

20 Claims, 22 Drawing Sheets

(56) References Cited

U.S. PATENT DOCUMENTS

| | | |
|---|---|---|
| 2016/0267056 A1* | 9/2016 | Hertzog .................. G06F 9/451 |
| 2017/0153032 A1 | 6/2017 | Ashgriz et al. |
| 2017/0280302 A1 | 9/2017 | Dickow et al. |
| 2018/0070291 A1 | 3/2018 | Breaux et al. |
| 2020/0402410 A1 | 12/2020 | Contreras et al. |
| 2021/0266714 A1 | 8/2021 | Cohen et al. |

* cited by examiner

SYSTEMS AND METHODS FOR LOCATING MOBILE DEVICES WITHIN A VEHICLE

This application is a continuation of U.S. patent application Ser. No. 17/315,095, filed May 7, 2021, which is a continuation of U.S. patent application Ser. No. 16/779,195, filed Jan. 31, 2020, now U.S. Pat. No. 11,006,257, which is a continuation of U.S. patent application Ser. No. 15/705,149, filed Sep. 14, 2017, now U.S. Pat. No. 10,555,133, which claims benefit of priority to U.S. Provisional Application No. 62/398,463, filed Sep. 22, 2016, which are hereby incorporated by reference in their entirety.

BACKGROUND

Technical Field

This disclosure relates generally to systems and methods for determining the location of devices inside a vehicle and applications thereof.

Description of the Related Art

Passengers in vehicles may carry mobile devices into the vehicles. Once inside, a passenger may place the mobile device at a location inside the vehicle cabin. Occasionally, the mobile device may move, fall onto the floor, or slide into a location on the vehicle that is difficult to see or access. As a result, mobile devices are often lost inside vehicles. Current methods for locating a mobile device in a vehicle require some degree of manual intervention, which can be tedious and cumbersome.

User elements in a vehicle, for example a car window, can be controlled with a manual control located on the interior of the vehicle. However, these manual controls are usually only accessible to a passenger who is sitting physically close to the control. For example, a passenger in the backseat of a car can generally only operate the window that is located closest to him or her. Moreover, if the particular window control that is closest to the passenger malfunctions, the window may become completely inoperable to the passenger.

SUMMARY

Systems and methods are disclosed herein to determine the location of mobile devices inside a vehicle. A vehicle includes an onboard computer and one or more signal generators and/or sensors on the interior of the vehicle. The signal generators and/or sensors are configured to interact with other signal generators and/or sensors on a mobile device inside the vehicle. Based on the interactions between the vehicle signal generators and/or sensors and the mobile device signal generators and/or sensors, the vehicle's onboard computer determines a location and/or orientation of the mobile device inside the vehicle. The mobile device's location and/or orientation may be used by the vehicle to provide a number of features.

In one embodiment, a method for enabling control of an object in a vehicle is disclosed. The method includes receiving, by sensors inside an enclosure of a vehicle, signals generated by signal generators in the enclosure of the vehicle. One of the sensors or signal generators may be part of a mobile device inside the enclosure. The method also includes determining a location and orientation of the mobile device from the signals. The method further includes determining, based on the location and orientation of the mobile device, an object in the enclosure that the mobile device is pointing to. The mobile device further includes transmitting a message to the mobile device in response to determining that the mobile device is pointing to the object, so as to cause the mobile device to display a user interface to allow the mobile device to control the object.

In another embodiment, a system is disclosed. The system includes sensors that are fixed to an enclosure and operable to receive signals generated by signal generators on a mobile device. The system also includes a computer in communication with the sensors, the computer configured to determine, based on the signals, a location of a mobile device inside the enclosure and an orientation of the mobile device relative to the enclosure; determine, based on the location and the orientation, that the mobile device is pointed towards an object in the enclosure with an associated control; and in response to the determination that the mobile device is pointed towards the object, transmit a message to the mobile device to cause the mobile device to display a user interface allowing the mobile device to control the object.

In yet another embodiment, a non-transitory computer-readable storage medium is disclosed. The non-transitory computer-readable storage medium stores instructions that, when executed by one or more processors, cause the one or more processors to perform operations. The operations include receiving signal data from sensors that are located at different locations inside an enclosure of a vehicle. The signal data may correspond to one or more signals generated by a mobile device inside the enclosure. The operations also include determining, based on the sensor data, a location of the mobile device inside the enclosure and an orientation of the mobile device relative to the enclosure. The operations also include determining, based on the location and the orientation, that the mobile device is pointed towards an object of the vehicle with an associated control. The operations also include transmitting a message to the mobile device to cause the mobile device to display a user interface that allows the mobile device to control the pointed-to object.

DETAILED DESCRIPTION

Figure 1:
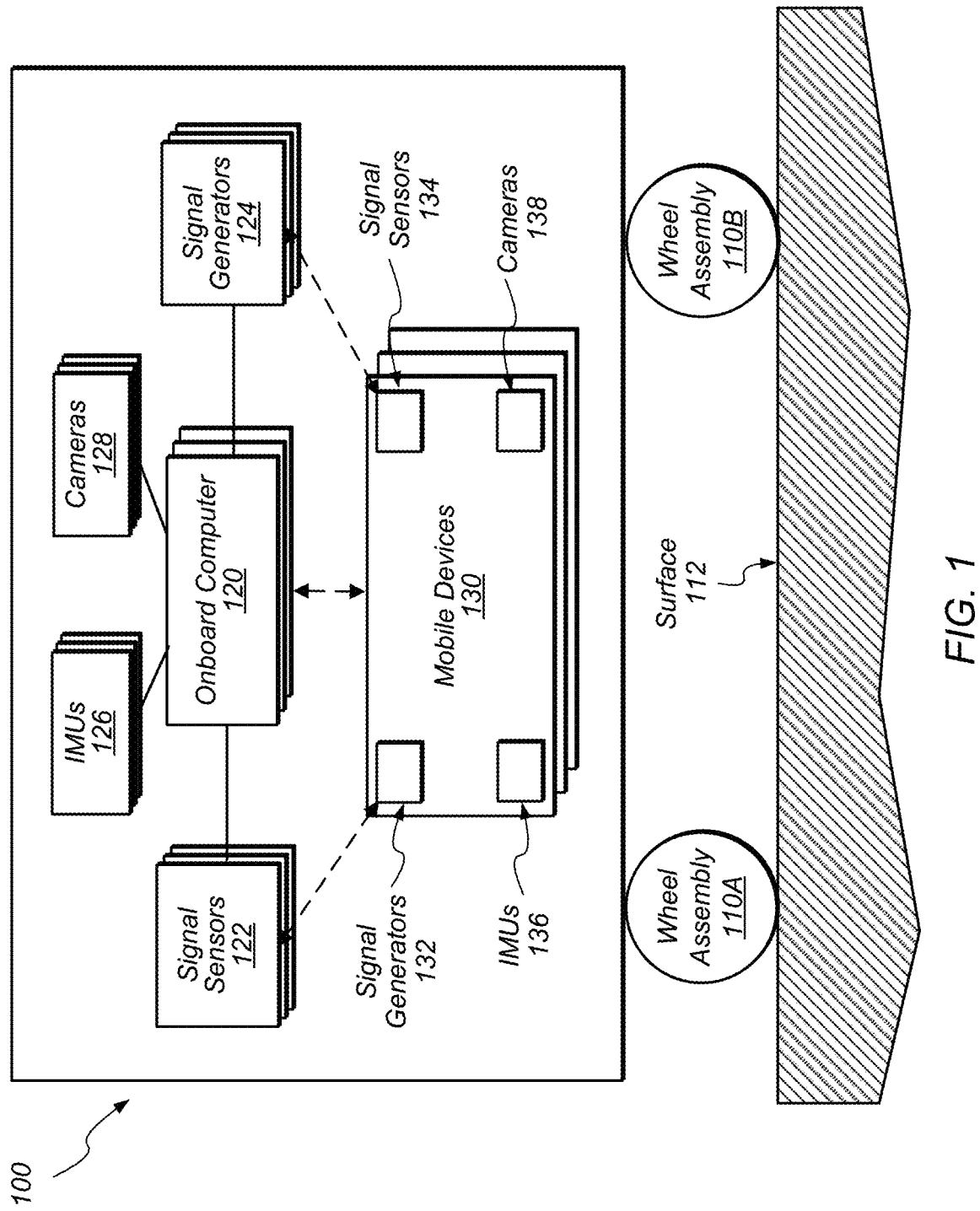
FIG. 1 illustrates a vehicle which includes a device location system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based at least in part on." As used herein, this term is used to describe one or more factors that affect a determination. This term does not foreclose additional factors that may affect a determination. That is, a determination may be solely based at least in part on those factors or based, at least in part, on those factors. Consider the phrase "determine A based at least in part on B." While in this case, B is a factor that affects the determination of A, such a phrase does not foreclose the determination of A from also being based at least in part on C. In other instances, A may be determined based solely on B.

FIG. 1 illustrates a schematic block diagram of a vehicle 100, according to some embodiments. The vehicle 100 will be understood to encompass one or more vehicles of one or more various configurations which can accommodate one or more passengers, including, but not limited to, automobiles, trucks, vans, buses, etc. As shown, vehicle 100 is a land-based vehicle with a plurality of wheel assemblies 110A and 110B. The wheel assemblies 110A and 110B may be coupled to respective tires, which allow the vehicle 100 to operate over a road surface 112. However, vehicle 100 may be a vehicle that is not land-based, such as a airplane. Vehicle 100 may be a manually operated vehicle or a vehicle capable of autonomous operation. In addition, persons skilled in the art will appreciate that some of the systems and methods described herein may be used in an environment other than a vehicle. For example, at least some embodiments described herein may be implemented in a room or a building.

Vehicle 100 may comprise an onboard computer 120. The onboard computer 120 may monitor and control various operations of the vehicle. For example, the onboard computer 120 may monitor the vehicle's speed and various aspects of the vehicle's engine, suspension system, breaking system, electrical systems, fuel or power supply, etc. In vehicles with some autonomous driving capabilities, the onboard computer 120 may control the movement of the vehicle, including the speed and direction of the vehicle. Moreover, the onboard computer 120 may programmatically monitor and control various user elements of the vehicle. For example, the onboard computer 120 may programmatically monitor and control the current temperature setting of the vehicle's air conditioning system. User elements that the onboard computer 120 may monitor or control include for example the vehicle's windows, doors, seats, lights, speakers, radios, air conditioning elements, and displays. The onboard computer 120 may also allow a user to manually control the user elements via a user interface such as, for example, a touch screen display in the vehicle. The onboard computer 120 is discussed in further detail in connection with FIG. 2.

As discussed, one or more mobile devices 130 may be inside the vehicle 100. A mobile device 130 may be any type of mobile device, such as a smartphone, tablet, or laptop computer. The mobile device 130 may be a computer that includes one or more processors and memory elements. The mobile device 130 may include network interfaces, including wireless network interfaces such as Wifi or Bluetooth. The mobile device 130 may include various user interface elements such as one or more displays or tactile or haptic feedback elements.

Both the onboard computer 120 and the mobile device 130 may have associated signal generators and sensors are capable of interacting with one another. As shown, the onboard computer 120 may be connected to signal sensors 122 and signal generators 124, and the mobile device may include signal generators 132 and signal sensors 134. The signal generators 124 and 132 are devices or components that may generate a signal that can be detected by signal sensors 122 and 134. The signal may be any type of signal including for example an audio signal or a type of electromagnetic or radio signal. Thus, signal generators 124 and 132 may include an audio speaker. Signal generators 124 and 132 may also be a light source, a display, or a wireless signal transmitter. Conversely, signal sensors 122 and 134 may be a microphone, or a sensor of electromagnetic radiation, including wireless signal receivers.

The onboard computer 120 and mobile device 130 may also have one or more associated inertial measurement units (IMUs) 126 and 136, respectively. An IMU 126 or 136 is a device that is capable of measuring its own motion, such as acceleration. The IMU 126 or 136 may be able to measure its translational velocity or acceleration in the x-, y-, or z-axis of a three-dimensional coordinate system, using three accelerometers. The translational velocity in a direction may be obtained by integrating the acceleration in that direction over a period of time. The IMU 126 and 136 may also be able to measure its angular velocity or acceleration in with respect to the three angular degrees of freedom: pitch, roll, and yaw, using one or more gyroscopes. The gyroscopes may be used to maintain an absolute frame of reference for the three angles. The angular velocity and acceleration may be obtained by differentiating the angular data over a period of time to determine a rate of change. The calculations may be carried out by dedicated hardware in the IMU device itself, or by the onboard computer 120.

The vehicle IMUs 126 may be coupled to different parts of the vehicle 100 to measure the motion that each part of the vehicle 100 is experiencing. The IMUs 126 may continuously collect motion data whenever the vehicle is moving and send the motion data to the onboard computer 120 to be analyzed or recorded. Alternatively, the onboard computer 120 may programmatically enable or disable the individual IMUs 126 based on certain conditions.

The onboard computer 120 and mobile device 130 may also have one or more associated cameras 128 and 138, respectively. The cameras 128 and 138 may be still image cameras or video cameras. The cameras 128 and 138 may include audio recording capabilities. The cameras 128 and 138 may be programmatically turned on and off by the onboard computer 120 or mobile device 130. The vehicle cameras 128 may be located at different positions in the vehicle's cabin, to obtain visibility coverage of various areas of the vehicle cabin from various perspectives. The cameras 128 and 138 may transmit the captured images back to the onboard computer 120 to be analyzed or recorded. The captured images may be analyzed using an image processing system configured to extract information from the images. For example, an image processing system may be implemented by the onboard computer 120 to recognize the mobile device 130 in an image.

Figure 2:
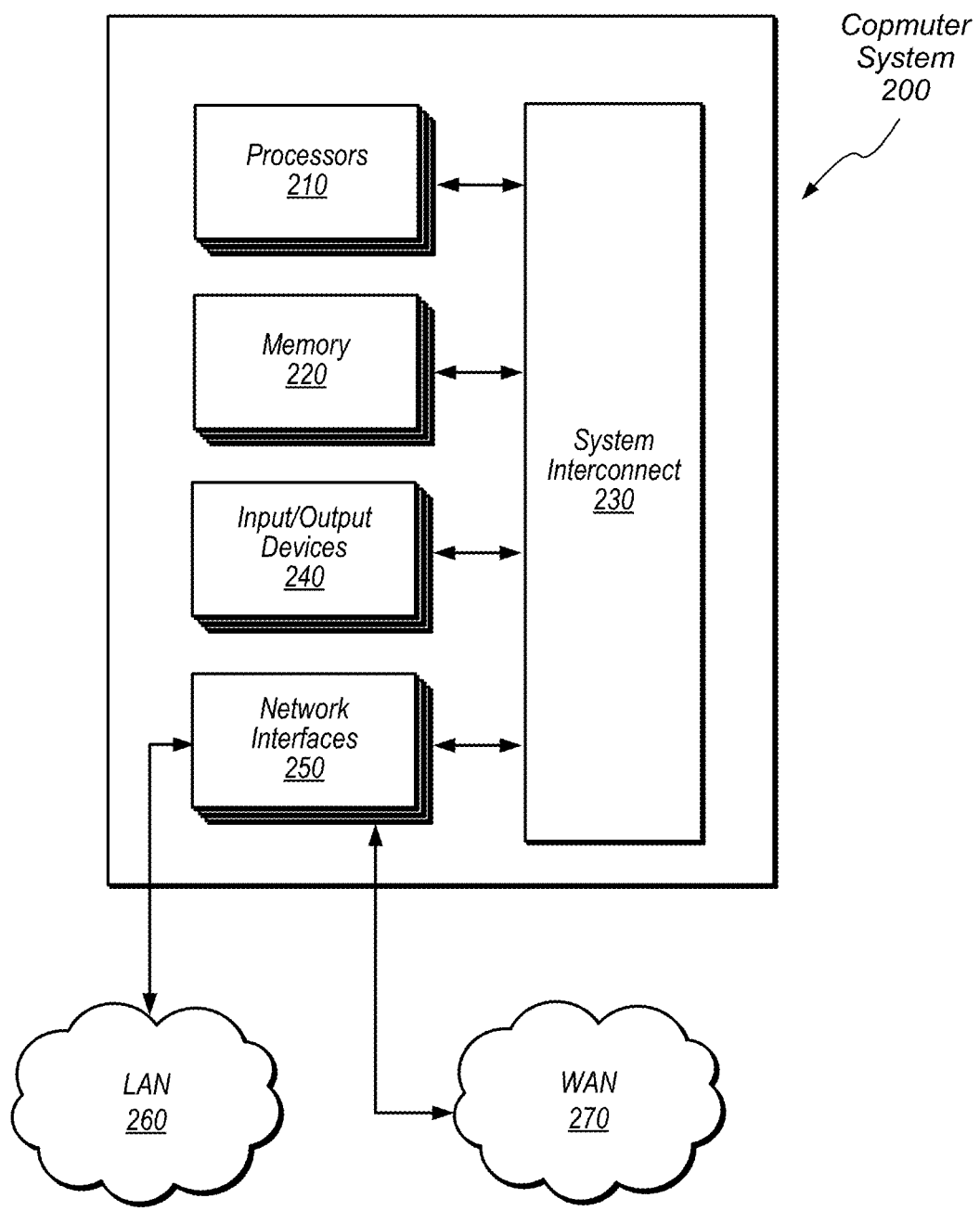
FIG. 2 illustrates an example computer system used to implement one or more portions of a device location system, according to some embodiments.

FIG. 2 illustrates an example computer system 200 that may be configured to implement the onboard computer 120 or the mobile device 130. In different embodiments, computer system 200 may be any of various types of devices, including, but not limited to, a personal computer system, laptop, notebook, tablet, slate, pad, or netbook computer, cell phone, smartphone, PDA, portable media device, handheld computer, workstation, network computer, a camera or video camera, a set top box, a video game console, a handheld video game device, an application server, a storage device, a television, a video recording device, a peripheral device such as a switch, modem, router, or in general any type of computing or electronic device.

In the illustrated embodiment, computer system 200 includes one or more processors 210 coupled to a system memory 220 via a system interconnect 230. Computer system 200 further includes network interfaces 250 coupled to system interconnect 230, and one or more input/output devices 240 coupled to the system interconnect 230, which can include one or more user interface (also referred to as "input interface") devices. In some cases, it is contemplated that embodiments may be implemented using a single instance of computer system 200, while in other embodiments multiple such systems, or multiple nodes making up computer system 200, may be configured to host different portions or instances of embodiments. For example, in one embodiment some elements may be implemented via one or more nodes of computer system 200 that are distinct from those nodes implementing other elements.

In various embodiments, computer system 200 may be a uniprocessor system including one processor 210, or a multiprocessor system including several processors 210 (e.g., two, four, eight, or another suitable number). Processors 210 may be any suitable processor capable of executing instructions. For example, in various embodiments processors 210 may be general-purpose or embedded processors implementing any of a variety of instruction set architectures (ISAs), such as the x86, PowerPC, SPARC, or MIPS ISAs, or any other suitable ISA. In multiprocessor systems, each of processors 210 may commonly, but not necessarily, implement the same ISA.

System memory 220 may be configured to store program instructions, data, etc. accessible by processor 210. In various embodiments, system memory 220 may be implemented using any suitable memory technology, such as static random access memory (SRAM), synchronous dynamic RAM (SDRAM), nonvolatile/flash-type memory, or any other type of memory. In the illustrated embodiment, program instructions included in memory 220 may be configured to implement some or all of the functionality described herein. Additionally, existing control data of memory 220 may include any of the information or data structures described herein. In some embodiments, program instructions and/or data may be received, sent or stored upon different types of computer-accessible media or on similar media separate from system memory 220 or computer system 200.

In one embodiment, the system interconnect 230 may be configured to coordinate I/O traffic between processor 210, system memory 220, and any peripheral devices in the system, including network interface 250 or other peripheral interfaces, such as input/output devices 240. In some embodiments, system interconnect 230 may perform any necessary protocol, timing or other data transformations to convert data signals from one component (e.g., system memory 220) into a format suitable for use by another component (e.g., processor 210). In some embodiments, system interconnect 230 may include support for devices attached through various types of peripheral buses, such as a variant of the Peripheral Component Interconnect (PCI) bus standard or the Universal Serial Bus (USB) standard, for example. In some embodiments, the function of system interconnect 230 may be split into two or more separate components, such as a north bridge and a south bridge, for example. Also, in some embodiments some or all of the functionality of system interconnect 230, such as an interface to system memory 220, may be incorporated directly into processor 210.

Network interfaces 250 may be configured to allow data to be exchanged between computer system 200 and other devices attached to other networks 260 and 270 or between nodes of computer system 200. As shown, network 260 is a local area network (LAN), which may be limited to computers and devices in or on the vehicle 110. Network 270 is a wide area network (WAN), which may include computers and devices that are remote from the vehicle 110. In various embodiments, network interfaces 250 may support communication via wired or wireless general data networks, such as any suitable type of Ethernet network, Wifi network, Bluetooth network, cellular network, satellite network, or via any other suitable type of network and/or protocol.

Input/output devices 240 may, in some embodiments, include one or more display terminals, keyboards, keypads, touchpads, touchscreens, scanning devices, voice or optical recognition devices, or any other devices suitable for entering or accessing data by one or more computer systems 200. Input/output devices 240 may also include the signal generators 122, signal sensors 124, IMUs 126, and cameras 128, as described herein. Input/output devices 240 may also include other systems on the vehicle 110, for example the vehicle's speedometer. Multiple input/output devices 240 may be present in computer system 200 or may be distributed on various nodes of computer system 200. In some embodiments, similar input/output devices may be separate from computer system 200 and may interact with one or more nodes of computer system 200 through a wired or wireless connection, such as over network interface 250.

Memory 220 may include program instructions, which may be processor-executable to implement any element or action described herein. In one embodiment, the program instructions may implement the methods described herein. In other embodiments, different elements and data may be included.

Those skilled in the art will appreciate that computer system 200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 200 may be transmitted to computer system 200 via transmission media or signals such as electrical, electromagnetic, or digital signals, conveyed via a communication medium such as a network and/or a wireless link. Various embodiments may further include receiving, sending or storing instructions and/or data implemented in accordance with the description herein upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Device Location Using Signal Generators and Sensors

Mobile device inside a vehicle may be located using signal generators and signal sensors. At a high level, a signal may be transmitted from a signal generator to a signal sensor. The signal generator may be fixed to the vehicle and the signal sensor to the mobile device, or vice versa. The signal received may be analyzed to determine spatial properties between the signal generator and the signal sensor. Thus, by using a number of signal generators or signal sensors whose locations are known to be fixed to a frame of reference, for example the interior of the vehicle, the location of the mobile device relative to the frame of reference may be determined. Those skilled in the art will appreciate that some of the systems and methods using signal generators and sensors as described herein may be implemented in environments other than a vehicle. For example, at least some embodiments described herein may be implemented in a room or a building.

The signal may travel from the mobile device to the vehicle; in other words, the signal may be generated by generators on the mobile device and transmitted to sensors on the vehicle. In that case, the vehicle's sensors may directly forward data about the sensed signals to the vehicle's onboard computer. Alternatively, the signal may travel in the opposite direction; in other words, the signal may be generated by generators on the vehicle and transmitted to sensors on the mobile device. In this case, the mobile device may perform an additional step to transmit sensor data associated with the signal back to the vehicle's onboard computer. This process is illustrated in FIG. 3.

Figure 3:
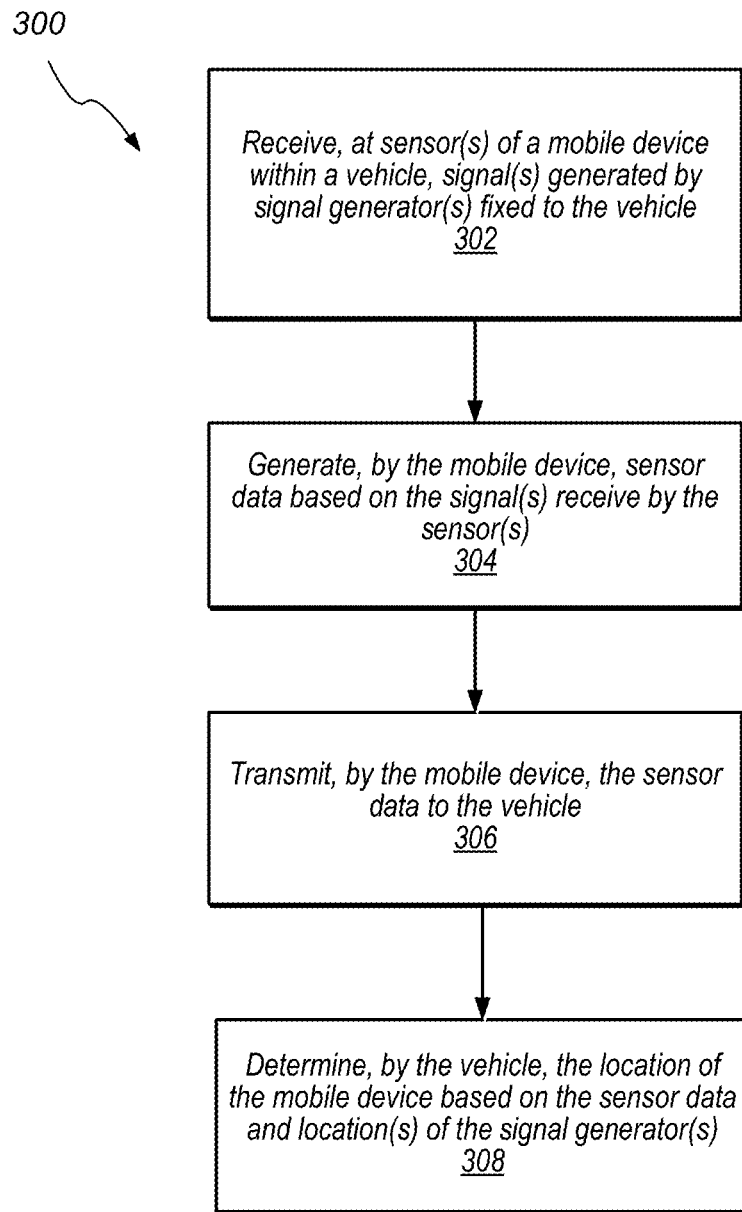
FIG. 3 is a flowchart diagram illustrating a process of interaction between a vehicle and a mobile device in a device location system, according to some embodiments.

FIG. 3 is a flowchart diagram illustrating a process of interaction between a vehicle and a mobile device in a device location system, according to some embodiments. The process 300 begins at operation 302, where one or more signals generated by one or more a signal generators fixed to a vehicle is received at one or more sensors of a mobile device. The mobile device may be a mobile device 130 depicted in FIG. 1.

At operation 304, the mobile device generates sensor data based on the signals received by one or more sensors of the mobile device. In some embodiments, the sensor data may simply be the raw data of the signal received by the sensor. In other embodiments, the mobile device may perform some degree of processing of the signal data. The processing may include, for example, removing of noise in the signal data. The processing may also perform an analysis of the signal data to extract certain metadata, so that the metadata is transmitted back to the vehicle, as opposed to the raw signal data. For example, the mobile device may analyze the signal data to determine different signal sources that are present in the signal data, or filter out certain signals in the signal data. The mobile device may determine the relative times and strengths of the different signals detected in the signal data.

At operation 306, the mobile device transmits the sensor data back to the vehicle. This transmission may be accomplished using a network connection, for example a Wifi connection, between the mobile device and the vehicle's onboard computer.

At operation 308, the vehicle determines the location of the mobile device based on the sensor data and the locations of the one or more signal generators.

In some embodiments, the mobile device may determine on its location in the vehicle on its own. For example, the mobile device may previously receive from the vehicle a layout of the vehicle's interior and/or the positions of various signal generators in the vehicle's interior. The mobile device may also previously receive information that allows the device to identify the signals from each of the signal generators. When the one or more signals are received by the mobile device, the mobile device may use the previously received information to carry out the location determination without aid from the vehicle's onboard computer. The mobile device may then transmit its own location back to the vehicle via the Wifi connection.

This disclosure may at places described embodiments where the signal travels in one direction, from the vehicle to the mobile device, and at other places embodiments where the signal travels in the other direction, from the mobile device to the vehicle. However, those skilled in the art will appreciate that in general, both directions of signal travel may be used.

Figure 4:
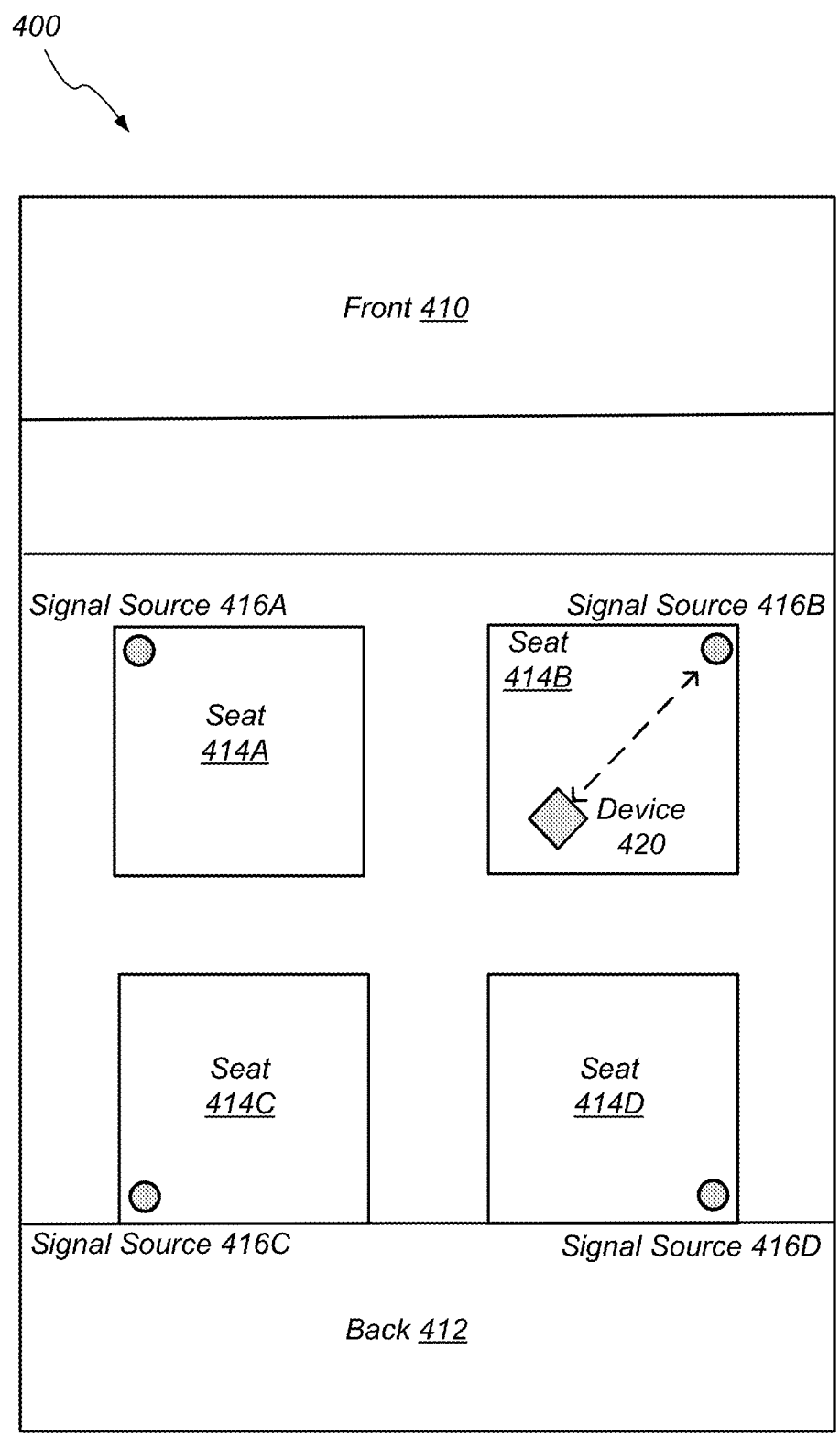
FIG. 4 illustrates a vehicle that includes a device location system using signal sensors to determine a device location, according to some embodiments.

Referring now to FIG. 4, a vehicle that includes a device location system using signal sensors according to some embodiments is illustrated. FIG. 4 depicts a top view of a vehicle 400. Vehicle 400 includes a front 410 and a back 412. Vehicle 400 also includes a plurality of seats 414A-D and respective signal sources 416A-D. A mobile device 420 is located on seat 414B.

To locate mobile device 420, vehicle 400 may cause all four signal sources 416A-D to generate separate signals. For example, the signal sources 416A-D may each generate an audio signal of a different frequency or tone. The signal sources 416A-D may generate the signals simultaneously. Alternatively, each of the signal sources 416A-D may generate a signal at a different time. The actual sequence of signals may be determined by the onboard computer of the vehicle 400.

The mobile device 420 may include an audio sensor that detects the signals from signal sources 416A-D. The mobile device 420 may determine the strength or volume of the four signals, and the respective tone or frequency of the signals. Alternatively, the mobile device 420 may determine the respective time that each of the four signals were received. In the example in the figure, the mobile device 420 may sense that the signal received from signal source 416B was received with the highest volume. The mobile device may then transmit this sensor data back to the vehicle's onboard computer. With this information, and based on the respective locations of the four signal sources 416A-D, the onboard computer may determine that the mobile device 420 is located on seat 414B, as depicted.

Different types of signals may be used with embodiments of the device location system. In some embodiments, electromagnetic or radio signals may be used. For example, a signal generator may emit a pulse of infrared (IR) radiation. The pulse may be detected by an IR sensor. Wireless communication transceivers, such as Wifi or Bluetooth transceivers, are capable of generating and receiving wireless signals in the frequency band assigned according to their communication protocol. These transceivers are also capable of detecting the strength of a signal in their assigned band. Audio signals may also be used. In that case, the signal generator may be a speaker that generates a chirp, and the signal sensor may be a microphone that can detect the chirp.

Embodiments of the device location system may use a plurality of types of signal generators and sensors in combination. In some embodiments, the system may choose the type of signal to use based on the current conditions of the vehicle or certain preset policy. For example, under certain lighting conditions, an IR signal may be difficult to detect and an audio signal may be preferable. In other embodiments, multiple signal types may be used to assist in or confirm a location determination. For example, the vehicle's onboard computer may rely on only Wifi signals to determine an approximate location of a device by default, but turn on other forms of location sensing signals when more precision is needed.

In some embodiments, the signals may be chosen so that they are not generally detectable by humans, so as to not disturb the passengers in the vehicle. For example, in the case of an audio signal, the signal may be implemented as a tone that lies above the human audible frequency range, which approximately spans from 20 Hz to 20 kHz. In the case of an electromagnetic signal, the signal may be chosen to have a wavelength that is outside the human visible light spectrum, which ranges approximately from 390 to 700 nm.

Figure 5:
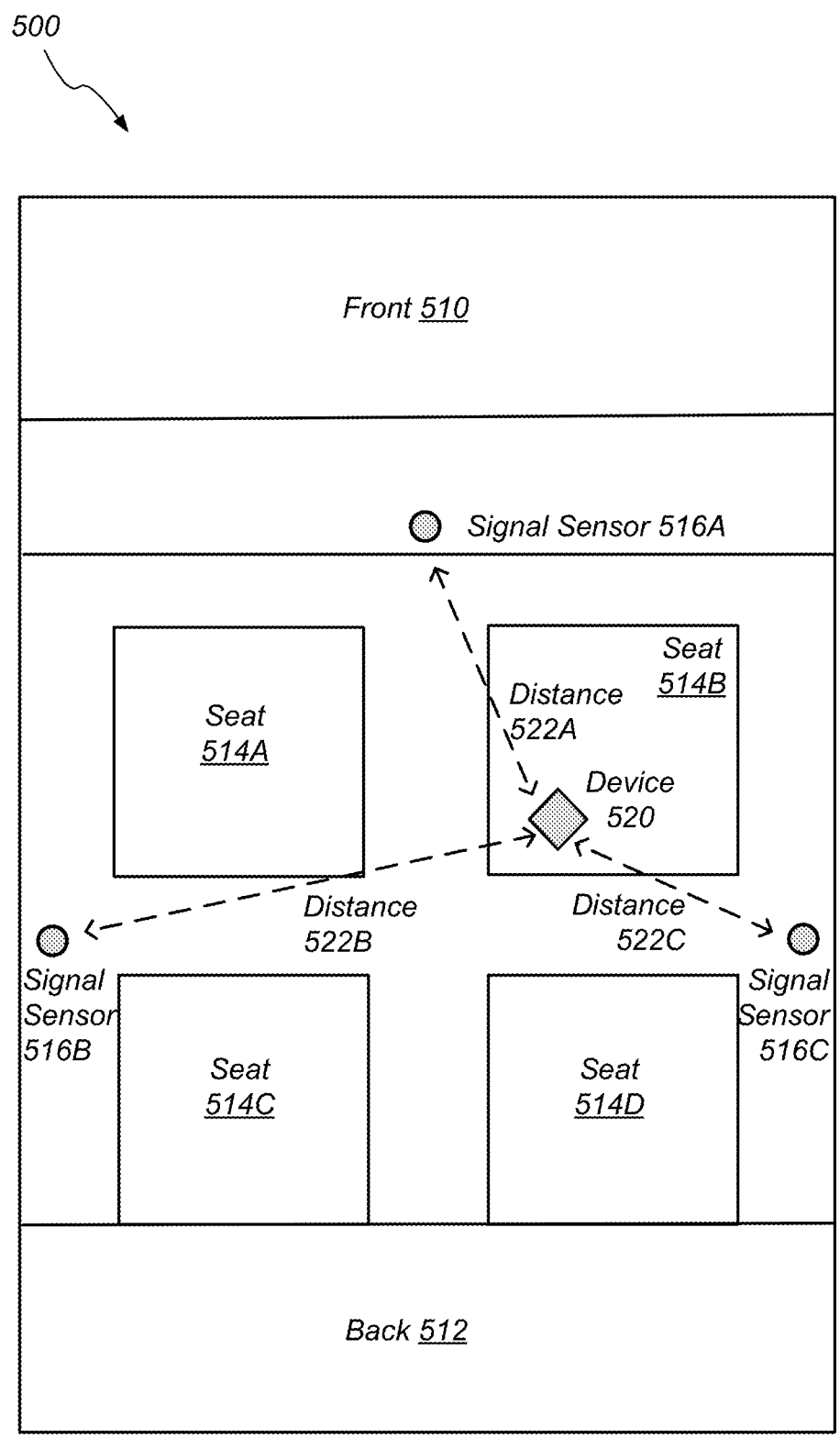
FIG. 5 illustrates a vehicle that includes a device location system using signal sensors to determine a device location, according to some embodiments.

Turning now to FIG. 5, a vehicle that includes a device location system using signal sensors according to some embodiments is illustrated. FIG. 5 depicts a top view of a vehicle 500. Vehicle 500 includes a front 510 and a back 512. Vehicle 500 also includes a plurality of seats 514A-D and respective signal sensors 516A-C. A mobile device 520 is located on seat 514B.

In this illustrated embodiment, to locate mobile device 520, the mobile device 520 may generate a signal that is detected by signal sensors 516A-C. The attributes of the received signals at the three sensors may be analyzed to determine respective distances 522A-C respectively between the mobile device 520 and each of the sensors 516A-C. Based on these distances 522A-C, the vehicle 500 may determine a location of the mobile device 520 within the vehicle's cabin.

The distance between the signal sensors 516A-C and the mobile device 520 may be determined in a number of ways. In one embodiment, the strength of the signal is used to determine the distance. In general, for a signal that radiates out uniformly in all directions, the strength of the signal various inversely with the square of the distance that the signal travels. Thus, the strength of the signal (e.g., the detected volume of an audio signal) may be used to calculate the distance between the signal generator and the signal sensor.

In another embodiment, if a mechanical wave signal is used, for example an audio signal, the distance may be determined from the signal's time-of-flight. For example, the speed of sound through the air under normal conditions is generally known to be approximately 340 meters per second. For a microphone with a sampling rate of 20 kHz, the microphone may detect 340 m/20,000=1.7 cm of difference in terms of distance. That is, for every 1.7 cm that a sound signal must travel to the microphone, that additional distance will be detected by the microphone as a delay of one sample cycle. Audio sensors with sampling rates higher than 20 kHz currently exist. Thus, the time-of-flight of an audio signal can be measured and used to determine the signal's travel distance to a reasonable degree of precision.

In yet other embodiments, signals that result from reflections inside the vehicle 500 may be detected and ignored. For example, the vehicle 500 may have walls that are designed to reduce signal reflectance, so that any echoes that are picked up by the sensors 516A-C are much weaker than signals that were not reflected. These weaker signals may be ignored. As another example, the sensors 516A-C may be located so that they can determine an approximate location of the mobile device 520 without any distance calculations. For example, if the mobile device 520 is in one of the front seats 514A or 514B in vehicle 500, the signal sensor 516A may detect a relatively strong signal as compared to sensors 516B and 516C. Based on this observation, the vehicle's onboard computer may infer that the mobile device 520 is in the front half of the vehicle. The onboard computer may then ignore certain sensors (e.g., sensors 516B and 516C) that do not have an unobstructed path to the mobile device 520, since any detected signals from these sensors are likely echoes.

Once the distances between the sensors 516A-C and the mobile device 520 are determined, the vehicle 500 may perform a triangulation to more precisely pinpoint the location of the device. In general, if a single sensor has determined that it is a distance d1 from the device, that determination will limit the three-dimensional position of the device to the surface of a sphere S1 of radius d1 centered around that sensor. If a second sensor determines a second distance d2, a second sphere S2 of radius d2 centered around the second sensor is defined. The position of the device is then limited to the intersection of S1 and S2, which may be a circle C1. If a third sensor is used, the device can be further limited to the intersection of a sphere S3 and the circle C1, which may be only two points in space. If a fourth sensor is used, the device can be pinpointed to a single point in space.

In practice, the location of the mobile device may be narrowed down to a reasonable degree of precision using fewer than four sensors. For example, the circle C1 that results from the intersection of spheres S1 and S2 may be sufficiently small so as to locate the device to a reasonable degree of precision. This result may be more easily achieved by particular placement arrangements of signal generators or sensors in the vehicle's interior. For example, two sensors that are farther apart tend to produce spheres S1 and S2 with smaller intersections. In addition, a sensor that is very close to the device produces a smaller sphere and thus a smaller intersection. Signal generators and sensors may be placed in locations close to where the device is likely to be, so that more precise location determinations may be made. For example, because the device is likely to be in front of the passenger sitting in a seat, signal generators and/or sensors may be located on seat armrests, seatback, and/or the seatbelt buckle, which may be generally fixed to the vehicle.

Figure 6:
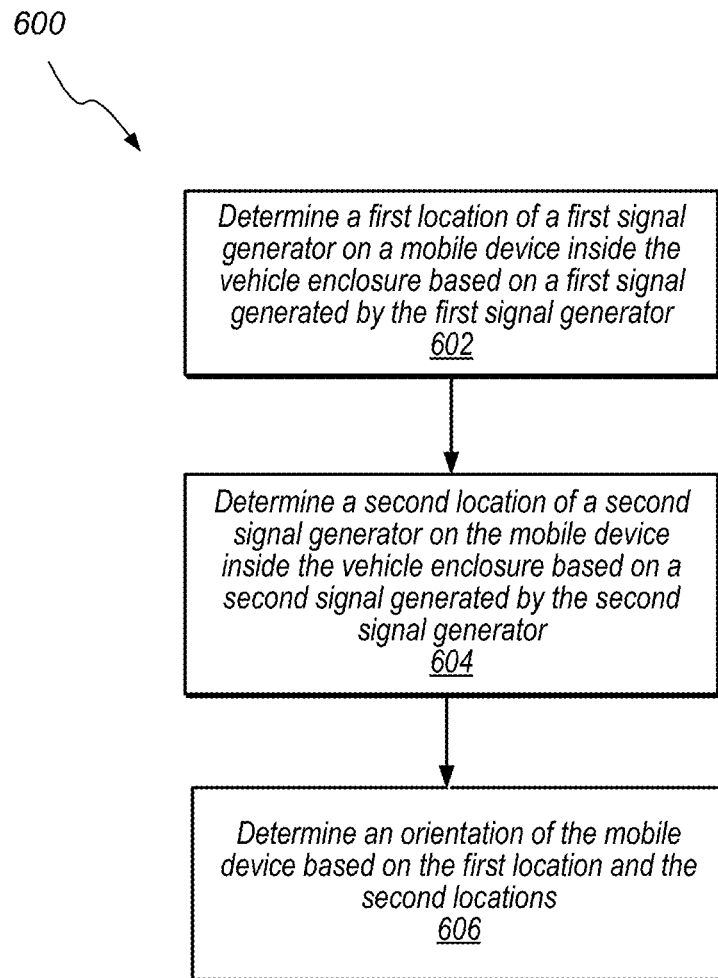
FIG. 6 illustrates a vehicle interior that includes a device location system using signal sensors to determine a device location, according to some embodiments.

FIG. 6 is a flowchart diagram illustrating a process of determining the orientation of a mobile device in a device location system, according to some embodiments. In some embodiments, the mobile device may include two or more signal generators or signal sensors to aid in the determination of the device's orientation. In preferred embodiments, the two signal generators or sensors are spaced far apart on the device to allow for easier determination. For example, a mobile device may comprise two audio speakers, one on the top of the device, and a second on the bottom. The orientation of the device may be determined from the locations of the two speakers.

The process 600 begins with an operation 602 to determine a first location of a first signal generator on the mobile device inside the vehicle enclosure based on a first signal generated by the first signal generator. The determination of this first location may be accomplished using the plurality of signal sensors located in the vehicle's enclosure, as discussed above.

At operation 604, the process determines a second location of a second signal generator on the mobile device inside the vehicle enclosure based on a second signal generated by the second signal generator. Operations 602 and 604 may be carried out simultaneously using two detectably different signals. Alternatively, operations 602 and 604 may be carried out with two signals at two different points in time. If the two signals are transmitted at different times, the mobile device may monitor that the mobile device has not changed orientation during the times the two signals are sent. The mobile device may accomplish this using its IMU, which is able to detect movement of the device.

At operation 606, an orientation of the mobile device is determined based on the first and second locations. In general, the orientation of the mobile device can be sufficiently determined based on just two points on the device. In a preferred embodiment, the two points are located far apart on the device so the determinations can be more accurate. If the two points are on the top and the bottom of the device, these two points are sufficient to determine the pointing direction of the device along its longitudinal axis. However, with just two points, it is not fully determined how the device is rotated about the longitudinal axis. To fully determine this rotational position of the device, a third point on the mobile device may be used. Alternatively, the vehicle may obtain from the device its IMU data. The device's IMU data will indicate additional orientation-related information. With this information, the rotational position of the device can be determined.

Figure 7:
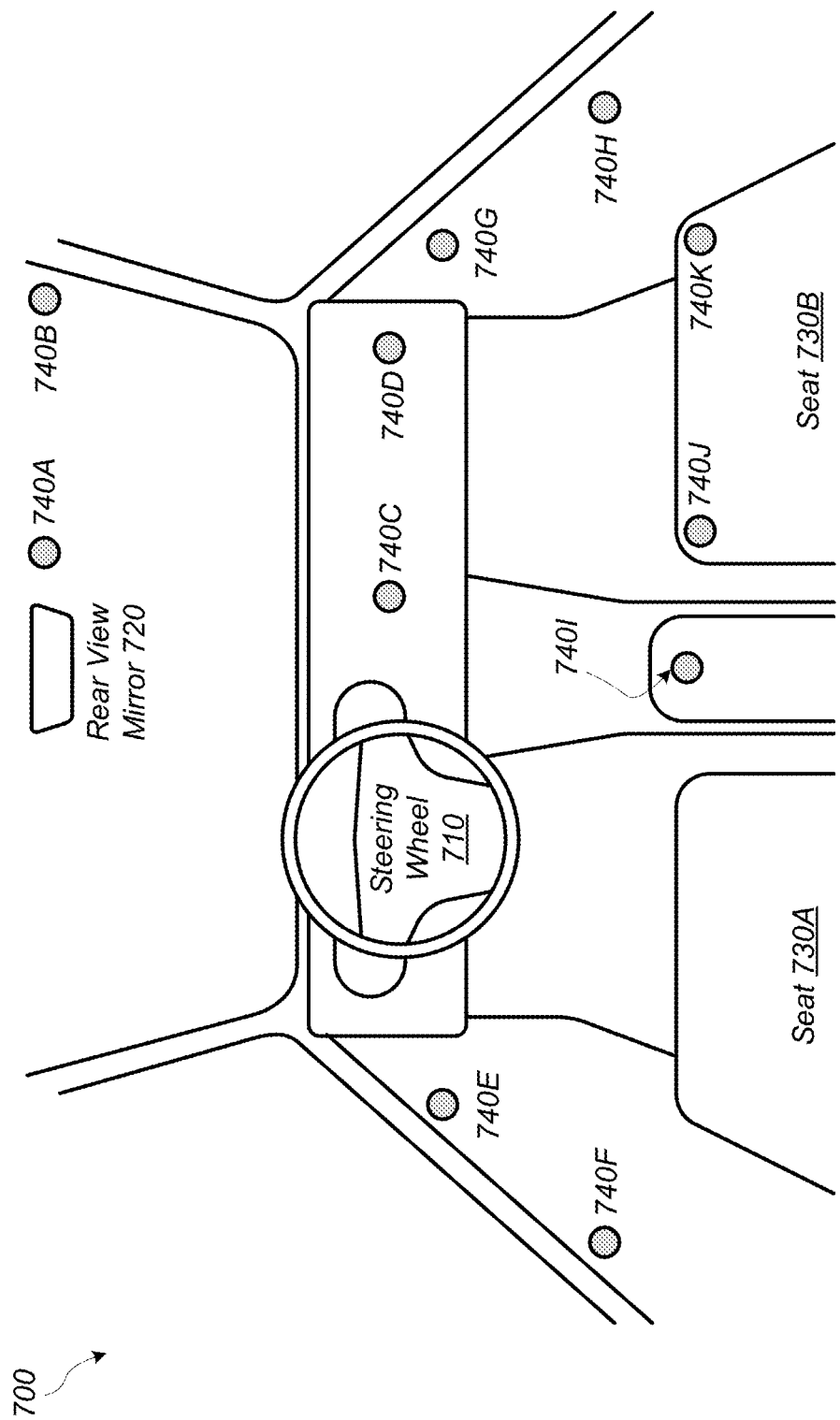
FIG. 7 is a flowchart diagram illustrating a process of determining the orientation of a mobile device in a device location system, according to some embodiments.

FIG. 7 illustrates a vehicle interior that includes a device location system using signal sensors and/or generators to determine a device location, according to some embodiments. FIG. 7 depicts a view of the front cabin of a vehicle 700. The exemplary cabin contains a steering wheel 710, a rear view mirror 720, and seats 730A and 730B. The colored circles 740A-K in FIG. 7 represent signal generators and/or signal sensors.

The placement of the signal generators/sensors 740A-K in the exemplary vehicle cabin are designed to detect the location of a mobile device located in the vicinity of the passenger side seat 730B. The generators/sensors 740A-K are arranged around and close to the expected location of the mobile device in seat 730B. This arrangement allows any small changes in the position of the mobile device to be more accurately detected, so that the device's location can be measured with greater precision. The group of sensors/generators 740A-K may include a few sensors/generators (e.g., 740A, 740B, 740E, and 740F) that are farther away from the group. These farther sensors/generators enable the system to perform better triangulation. When a group sensors/generators are located too closely together, the intersection between the distance measurements by each of the sensor/generator becomes too large, and the location information that is generated by these sensors/generators becomes less informative. Furthermore, in the exemplary arrangement shown, most of the sensors/generators 740A-K are placed at the approximate expected height of the passenger's torso while the passenger is seated. This arrangement is useful because many useful applications of device location rely on detection of small changes of the device location or orientation in this plane. For example, most of the user controls in the vehicle are located at or around this height. Thus, precise location and orientation measurements at this height are important.

To improve the location determination process, the mobile device may register with the vehicle upon first contact. Software may be downloaded to the device that allows the device to communicate with the vehicle's onboard computer about various aspects of the location determination functionality. For example, the device may be assigned an identifier so that the vehicle may associate data with the particular device. The vehicle may discover the capabilities of the device, for example, the types of signal sensors and generators the device has. The vehicle and the device may perform a handshake procedure to determine certain parameters of how location determination will be carried out. For example, vehicle's onboard computer and the device may elect a particular method of location determination (for example IR signaling) as a preferred method, and for a particular method, the operational parameters (for example the intensity and the wavelength of the IR pulses to use).

In addition, upon first contact, the vehicle onboard computer may conduct an interactive session with the device to calibrate the vehicle's sensors/generators to the device. For example, during this calibration process, the user may be asked to place the device at particular locations in the vehicle, so that the vehicle can measure the signaling that is produced by the device at these locations. The vehicle may record a signature in terms of detected signals for the device at each location. These signatures may be matched against the signaling of the device in actual operation, to assist in the determination of device location. This calibration process may be repeated over time to adjust the parameters of the location determining system to account for small changes to the vehicle or the device over time. This calibration process may occur on a periodic basis and may be ongoing.

Device Location Using Inertial Measurement Units

In some embodiments, device location may employ other measurement devices in addition to or in place of the signal generators and signal sensors. In some embodiments, the vehicle may be equipped with inertial measurement units, or IMUs.

Referring back to FIG. 1, a plurality of IMUs 126 may be affixed to the vehicle's body. The vehicle IMUs 126 may be coupled to different parts of the vehicle 100 to measure the motion that each part of the vehicle 100 is experiencing. The IMUs 126 may capture motion data at different points of the vehicle. The IMUs 126 may continuously collect motion data whenever the vehicle is moving and send the motion data to the onboard computer 120 to be analyzed or recorded. In addition, the mobile devices 130 may be equipped with its own IMUs 136. The vehicle's onboard computer 120 may obtain data from the device IMUs 136. The onboard computer 120 may use the vehicle's motion data and device's motion data to locate the device 130.

In one embodiment, the location of the device is determined using a rigid body motion function. This method works best for portions of the vehicle that are rigid, so that the distance between any two points on the portion of the vehicle's body remain essentially constant during normal vehicle operations. For example, this property generally holds true for parts of the vehicle that are rigidly fixed to the vehicle frame. Moreover, this method works best when the mobile device to be located stays fixed with respect to the vehicle.

Figure 8:
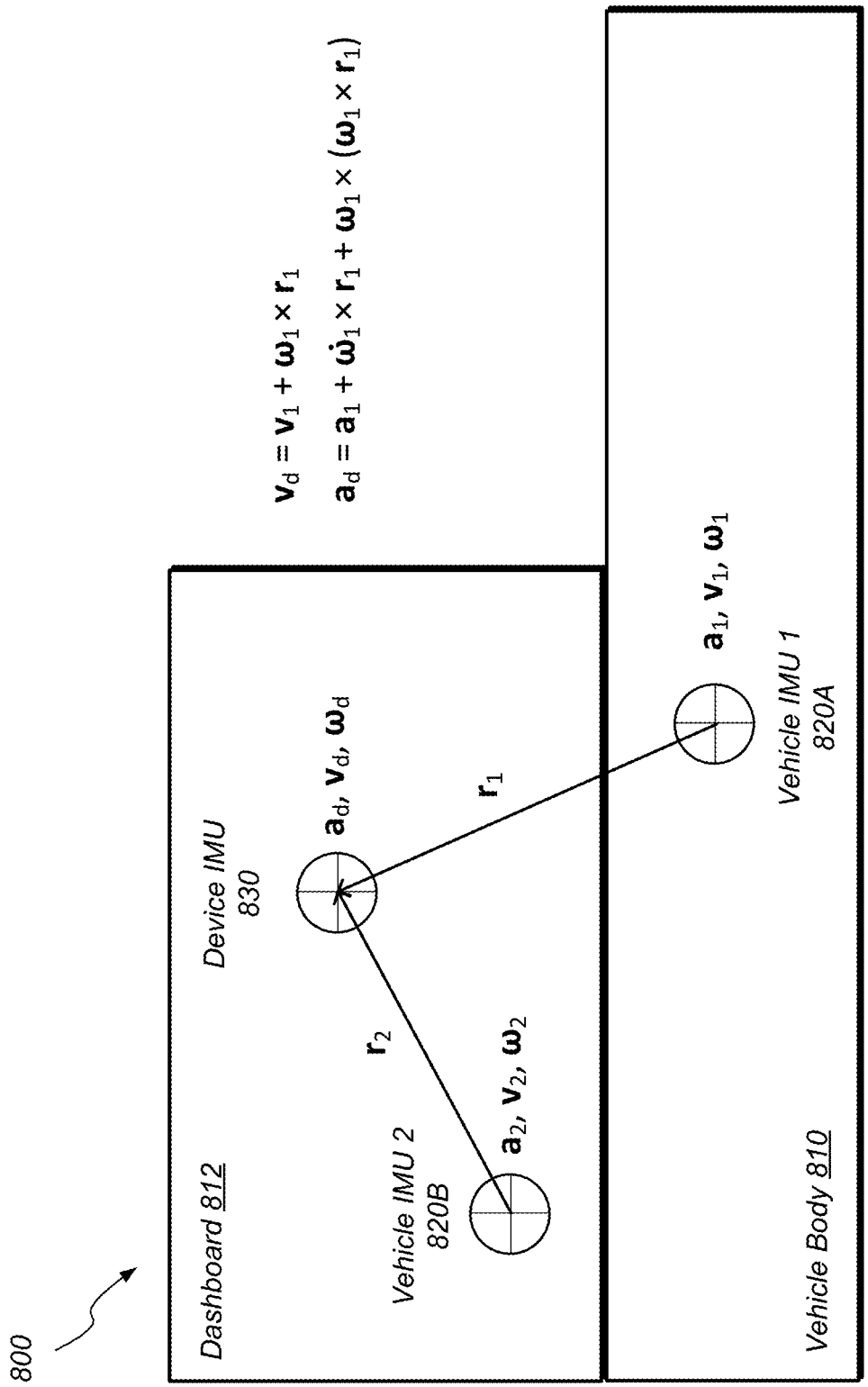
FIG. 8 illustrates a vehicle that includes a device location system using inertial measurement units, according to some embodiments.

FIG. 8 illustrates a vehicle that includes a device location system using inertial measurement units, according to some embodiments. In the figure, a vehicle 800 includes a vehicle body 810 and a dashboard 812. The dashboard 812 is rigidly fixed to the vehicle's body 810. Although the figure shows only a dashboard 812, any portion of the vehicle that is rigidly fixed to the vehicle body 810 may be used.

In the figure, the vehicle 800 includes two IMUs 820A and 820B, which are located on different locations in the vehicle 800. The vehicle 800 also has onboard a mobile device that includes a device IMU 830. The mobile device is located on the dashboard 812.

The rigid body motion function method is based on the fact that in a rigid body, the velocity of one point on the body can be determined from the velocities and angular velocities of other points on the body. Conversely, when the motion data for two points are known, the relative location of one point can be determined from the location of the other point. Thus, the location of the device IMU 830 can be determined from the known locations of vehicle IMUs 820A and 820B, using the respective motion data of each IMU.

In general, the velocity of two points $p_1$ and $p_d$ in a rigid body are related by the following equation:

$$v_d = v_1 + \omega_1 \times r_1$$

where $v_d$ is the velocity at point $p_d$, $v_1$ is the velocity at point $p_1$, $\omega_1$ is the angular velocity at point $p_1$, and $r_1$ is a vector from $p_1$ to $p_d$.

In operation, the vehicle IMU 820A may act as point $p_1$, and determine $v_1$ and $\omega_1$ at its location. The device IMU 830 may act as point pd, and determine $v_d$ at its location. Given these three pieces of information, the vehicle's onboard computer may determine the relative location $r_1$ from the vehicle IMU 820A to the device IMU 830. A similar determination may be made using the vehicle IMU 820B depicted in the figure.

In other embodiments, other rigid body motion functions may be used. For example, the acceleration of two points $p_1$ and $p_d$ in a rigid body are related according to the following formula:

$$a_d = a_1 + \omega_1` \times r_1 + \omega_1 \times (\omega_1 + r_1)$$

where ad is the acceleration at point $p_d$, $a_1$ is the acceleration at point $p_1$, $\omega_1`$ is the time derivative of the angular velocity (or the angular acceleration) at point $p_1$, $\omega_1$ is the angular velocity at point $p_1$, and $r_1$ is a vector from $p_1$ to $p_d$.

In operation, the vehicle IMU 820A or 820B may act as point $p_1$ and determine $a_1$, $\omega_1$, and $\omega_1`$ at its location. The device IMU 830 may act as point pd and determine ad at its location. Given these values, the vehicle's onboard computer may determine the relative location r1 from vehicle IMU 820A or 820B to the device IMU 830.

To facilitate this determination using rigid body motion functions, the vehicle's onboard computer may first determine the relative orientation of the device IMU 830 with respect to the vehicle IMUs 820A and 820B. The two vehicle IMUs 820A and 820B may be oriented the same way by design; in other words, the two IMUs use the same three-dimensional coordinate system in their capturing and reporting of motion data. However, the device IMU 830 may be oriented differently. To account for this difference in orientation, the vehicle's onboard computer may compare the angular positions (pitch, roll, and yaw) determined by gyroscopes on the device IMU 830 to the angular positions of the vehicle IMUs. Alternatively, the onboard computer may compare the translational velocity or acceleration data between the device IMU 830 and the vehicle IMUs 820A and 820B. For example, if the vehicle IMUs 820A and 820B experience a uniform acceleration in the x-direction, while the device IMU 830 experiences a simultaneously acceleration at a direction between the x- and y-axis in the x-y plane, the onboard computer may determine that the mobile device is rotated by a certain angle in the x-y plane with respect to the vehicle's coordinate system. Once the device's relative orientation is determined, the onboard computer may apply trigonometric functions to the device's incoming motion data to translate the motion data to the vehicle's coordinate system. The trigonometric functions may continue to be used as long as the mobile device's orientation stays unchanged in the vehicle.

The vehicle may make repeated determinations of the location of the mobile device, over a period of time, based on the motion that the vehicle experiences over time. In general, whenever a vehicle IMU experiences some degree of angular motion, that angular motion may be used to compute a vector from the vehicle IMU to the device IMU.

Figure 9:
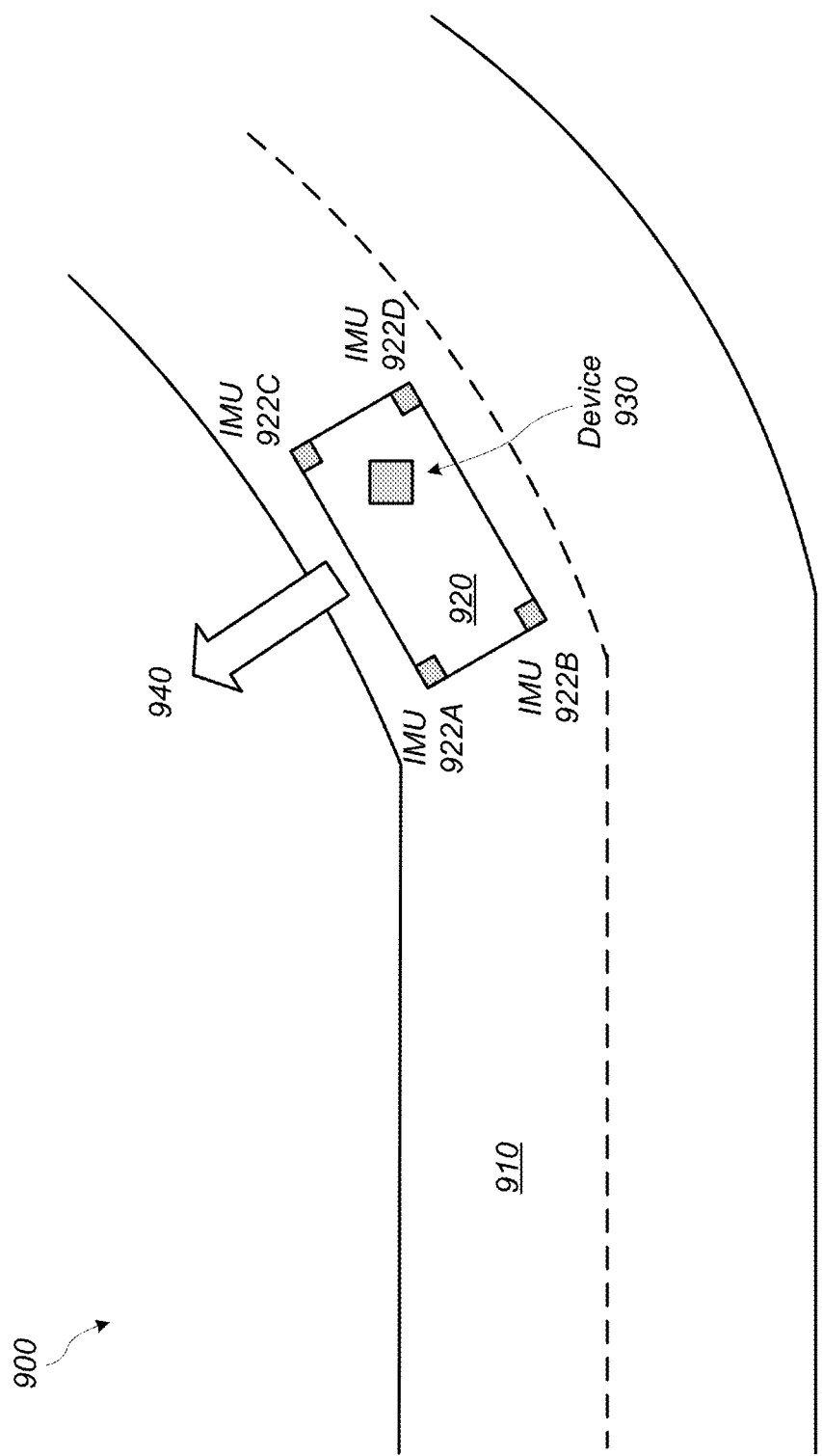
FIG. 9 illustrates a vehicle that includes a device location system using inertial measurement units traveling on a road, according to some embodiments.

FIG. 9 illustrates a scenario 900 involving a vehicle that includes a device location system using inertial measurement units, according to some embodiments. In the figure, the vehicle 920 is traveling along a road 910. The vehicle 900 includes four IMUs 922A-D at its four corners. The vehicle 900 has onboard a mobile device 930.

As the vehicle 920 turns to the left, its vehicle IMUs 922A-D experience measurable angular motion as the vehicle yaws to the left. Moreover, the vehicle IMUs 922A-D experiences a change in velocity and acceleration. In particular, IMUs 922B and 922D may experience a higher velocity relative to IMUs 922A and 922C, because the former IMUs are traveling a farther distance along the right side the vehicle 930. Moreover, as the vehicle 920 rounds the curve, it may experience a centripetal force 940 directed to a center of curvature for the curve. The centripetal force is stronger for points that are farther away from the center of curvature. Thus, IMUs 922B and 922D may experience different acceleration from IMUs 922A and 922C. IMUs on the mobile device 930 may also experience this motion as the vehicle 920 rounds the curve.

As the motion data is captured by the device IMU, the data may be streamed from the mobile device 930 to the vehicle's onboard computer over a Wifi connection between the two. The vehicle's onboard computer may then determine the orientation of the mobile device 930 inside the vehicle 920, and rotate the incoming motion data to account for any orientation differences between the device IMU and the vehicle IMUs 922A-D. The vehicle's onboard computer may use one or more rigid body motion functions to determine the location of the mobile device 930 relative to the vehicle IMUs 922A-D.

In the example depicted in FIG. 9, the rotation is purely in the x-y plane. Thus, in this case, there is no change in the pitch of the vehicle 920, and the rigid body motion functions described above cannot precisely determine a z-location or height of the mobile device 930. However, as the vehicle 920 makes further movements, the movements may provide the additional angular data needed to determine the location of the mobile device 930 in all three axes. For example, the vehicle may experience a pitch change as it travels over a dip or a hill on the road. The vehicle may experience a roll when it travels over a road that is banked. In general, the vehicle may also experience different types of angular motion due to various features on the road. All of these angular motions may be continually collected and analyzed over a period of time. This process may continue until the location of the mobile device 930 can be ascertained to a certain degree of precision.

However, it should be noted that if the mobile device 930 shifts positions relative to the vehicle's cabin, the collected data may no longer be usable. In that case, the location process may begin anew. In some embodiments, the vehicle's onboard computer may monitor whether the mobile device 930 has moved within the time period when the vehicle is attempting to ascertain its location. This condition may be detected based on the incoming data from the mobile device 930. For example, the device IMU data may indicate that the mobile device has changed orientations. The condition may also be assumed when either the vehicle IMUs or the device IMU experiences a severe acceleration. In one embodiment, the vehicle's onboard computer may cause the mobile device 930 to capture two images with one or more cameras of the mobile device 930, one image at the beginning of a time period, and a second image at the end of the time period. The images may be compared to determine whether the device 930 has shifted positions or changed orientations during the time period.

Moreover, vehicle IMUs may have some degree of inherent degree of imprecision. These problems may be mitigated using a number of techniques. First, better precision may be achieved by using more vehicle IMUs, so that they can be used to corroborate the findings of one another. The vehicle IMUs may be placed far apart to obtain location determinations from different places on the vehicle. Further, the vehicle IMUs may be placed to obtain better coverage of the vehicle's interior. A determination of location is more precise when the vehicle IMU is close to the device IMU. The vehicle IMUs may be place in a manner that they are close to locations where the mobile device is likely to be. For example, the vehicle IMUs may be placed near certain places on the vehicle's floor, certain areas around the seats, or certain compartments in the vehicle.

Figure 10:
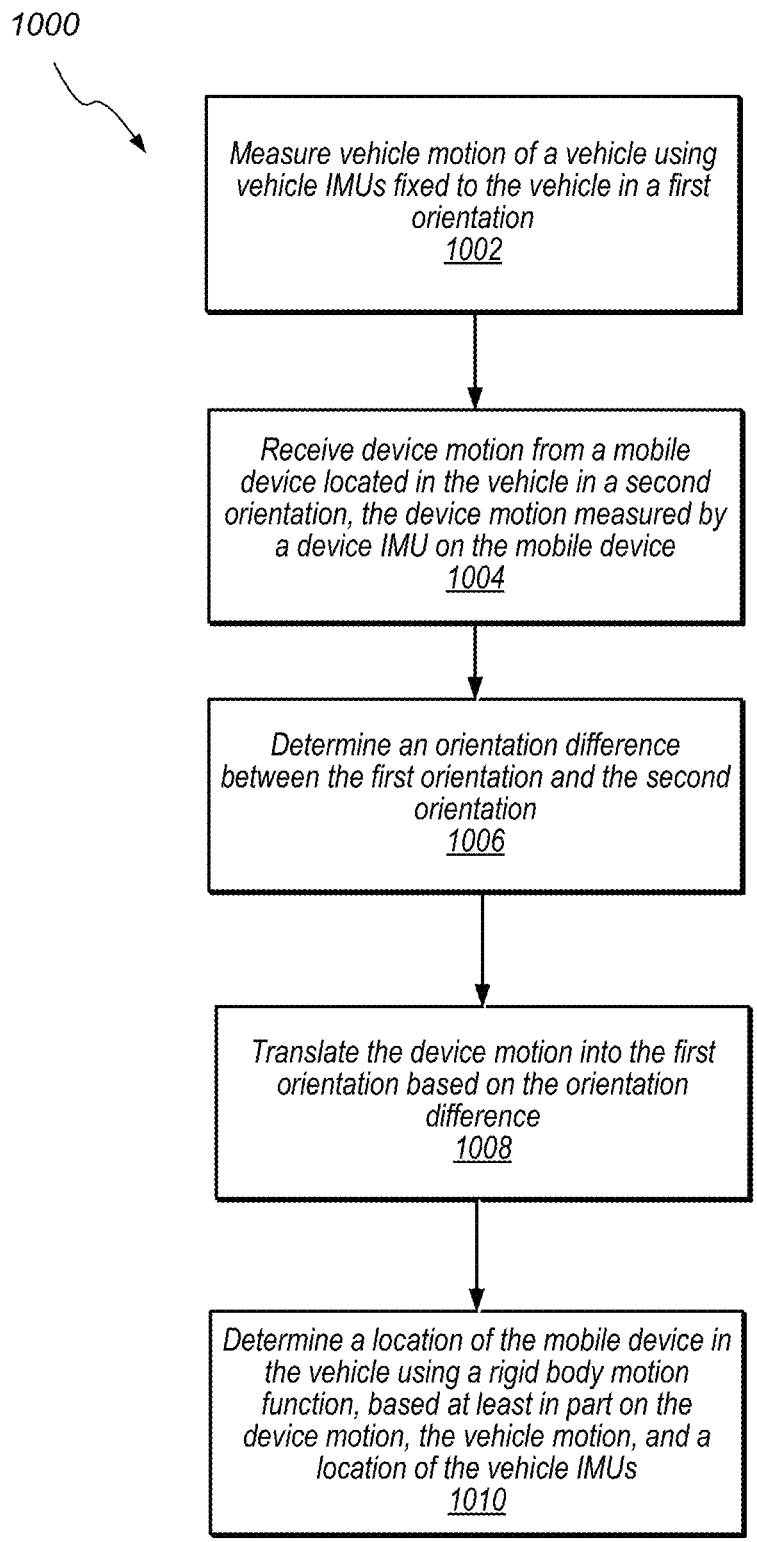
FIG. 10 is a flowchart diagram illustrating a process of determining the location of a mobile device in a device location system, according to some embodiments.

FIG. 10 is a flowchart diagram illustrating a process of determining the location of a mobile device in a device location system, according to some embodiments.

The process 1000 starts at operation 1002. In operation 1002, vehicle motion of a vehicle is measured using one or more vehicle IMUs, the vehicle IMUs being fixed to the vehicle in a first orientation.

In operation 1004, device motion is received from a mobile device located inside the vehicle in a second orientation. The device motion is measured by a device IMU on the mobile device. Data of the device motion may be, for example, transmitted from the mobile device to the vehicle's onboard computer over a Wifi connection between the two.

In operation 1006, an orientation difference is determined between the first orientation and the second orientation. The difference may be represented in terms of three angles that represents the difference between the vehicle and device in terms of the current pitch, roll, and yaw. The determination may be made on the current readings of the IMU's gyroscopes, or determined from the translational motion data from the IMUs.

In operation 1008, the device motion is translated into the first orientation based at least in part on the orientation difference. This may be accomplished by the vehicle's onboard computer using one or more trigonometric functions.

In operation 1010, a location of the mobile device in the vehicle is determined using a rigid body motion function, based at least in part on the device motion, the vehicle motion, and the locations of the one or more vehicle IMUs. The rigid body motion function may be a function to determine a velocity of a point on a rigid body based on motion data from another point on the rigid body. The rigid body motion function may be a function to determine an acceleration of a point on a rigid body based on motion data from another point on the rigid body.

Under certain conditions, the rigid body motions function method may not be useful. For example, in a situation where the vehicle is traveling on a road that is essentially straight and flat, the rigid body motion functions are not very informative to determine the location of the mobile device. However, even under these conditions, the vehicle may use its IMUs measure the vibrational movement of a vehicle to locate the mobile device.

Figure 11:
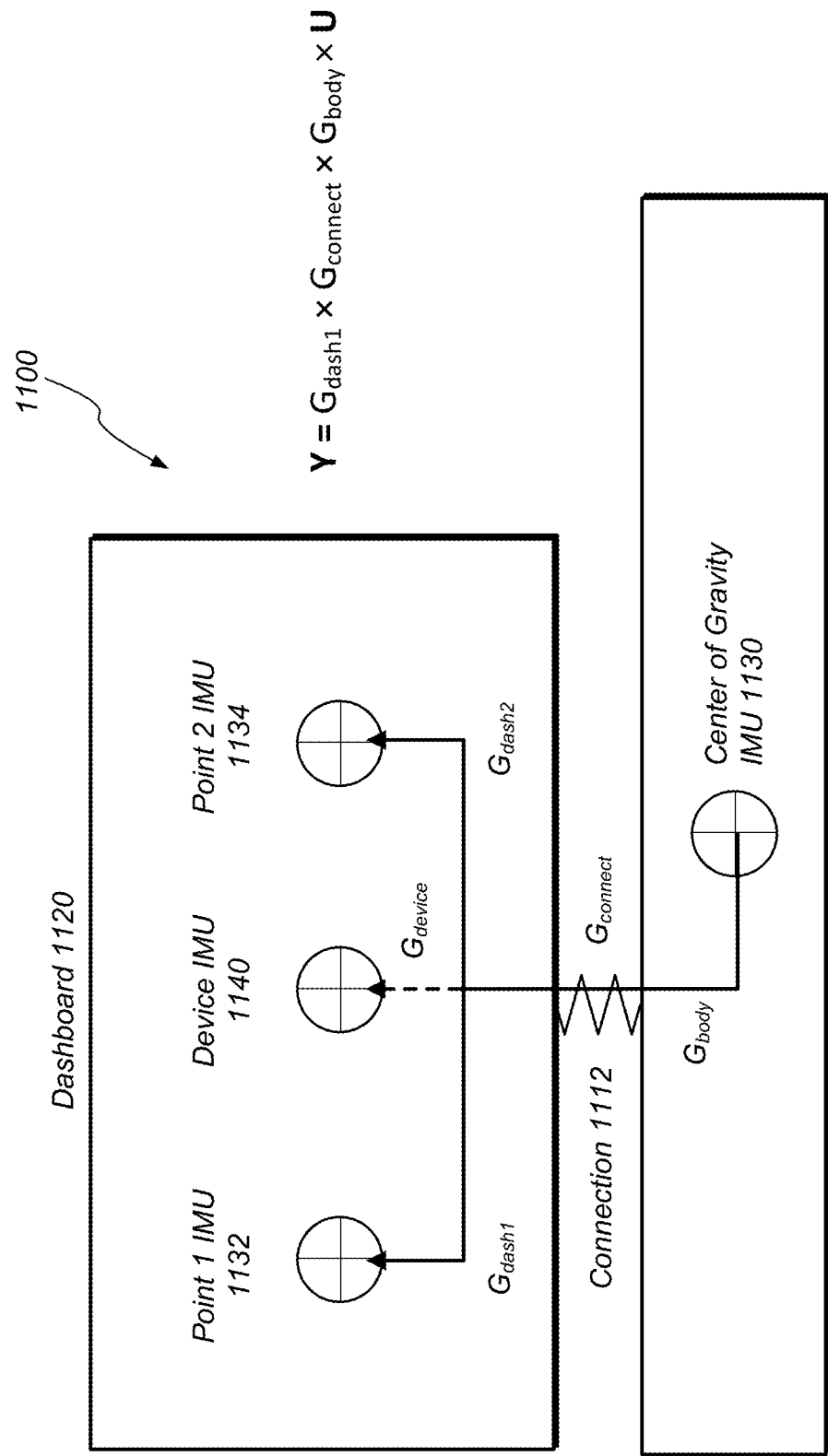
FIG. 11 illustrates a vehicle that includes a device location system using inertial measurement units, according to some embodiments.

FIG. 11 illustrates a vehicle that includes a device location system using inertial measurement units, according to some embodiments. The vehicle 1110 comprises a vehicle body 1110 and a dashboard 1120, connected via a connection 1112. The vehicle body 1110 comprises a point that represents the center of gravity of the vehicle, and an associated IMU 1130 at that location. The dashboard 1120 includes two IMUs 1132 and 1134. A mobile device including device IMU 1140 is residing on the dashboard 1120. The arrows in the figure labeled with the letter G represents transfer functions between the different parts of the vehicle 1100.

In general, a vehicle such as vehicle 1100 is assembled from a number of parts, each interconnected via connections such as connection 1112. Some of these connections are rigid, while others are flexible and exhibit spring-like behavior. Because of this, certain parts of the vehicle will exhibit low-frequency vibrational motion as the vehicle moves. These vibrations may be strong enough and slow enough to be detected by the vehicle and device IMUs. These vibrations may be used by the vehicle to determine that the device is near or in contact with a particular part of the vehicle.

When one part of the vehicle moves or vibrates in a certain way, that motion becomes an input to another part of the vehicle that is connected to it. For example, in the figure, the vehicle body 1110 is connected to the dashboard 1120 via connection 1112. The vibration motion in the vehicle body 1110 will act as impulses to dashboard 1120, producing a responsive vibration motion in the dashboard 1120. The response of dashboard 1120 to the vehicle body 1110 may be represented as a transfer function Gconnect. With the Gconnect transfer function is applied to the input movement from the vehicle body 1110 (U), the transfer function will produce an expected output movement (Y). The figure depicts a number of such transfer functions between different points of the vehicle.

The transfer functions may be determined empirically at the time of the vehicle's manufacture. For example, the vehicle manufacturer may test particular parts of the vehicle by introducing particular input motions via one part and measuring the responses in other parts. From these tests, the transfer functions for the vehicle may be computed. The transfer functions may be saved with the vehicle and accessible to the vehicle's onboard computer.

Moreover, the transfer functions may be transformed from functions in the time domain to functions in the s-domain, via a Laplace transform. The transfer functions may be more easily manipulated algebraically when they are expressed in the s-domain rather than the time domain. For example, in this context, to aggregate the effects of multiple connections in the vehicle's body, the transfer functions associated with the connections may simply be multiplied. Thus, a vibration input U detected at the center of gravity IMU 1130 may predictably generate a vibration response Y at the IMU 1132 at point 1, using the transfer function Gdash1×Gconnect× Gbody. The onboard computer of the vehicle 1110 may maintain these transfer functions as s-domain functions, and transform input data into the s-domain values using the Laplace transform during runtime.

During operation, the onboard computer of the vehicle 1110 may observe all input data U to the vehicle 1110 during a period of time. This input data may come from, for example, the suspension system of the vehicle 1110. Input data may also come from IMUs inside the vehicle that could detect for example the presence of passengers in the seats and/or heavy items in the vehicle's trunk. Based on these inputs and over the period of time, the vehicle 1110 may calculate a predicted vibration response at different parts of the vehicle's interior. This response can be compared to the vibration motion detected by the device IMU 1140 to determine the device's location.

Figure 12:
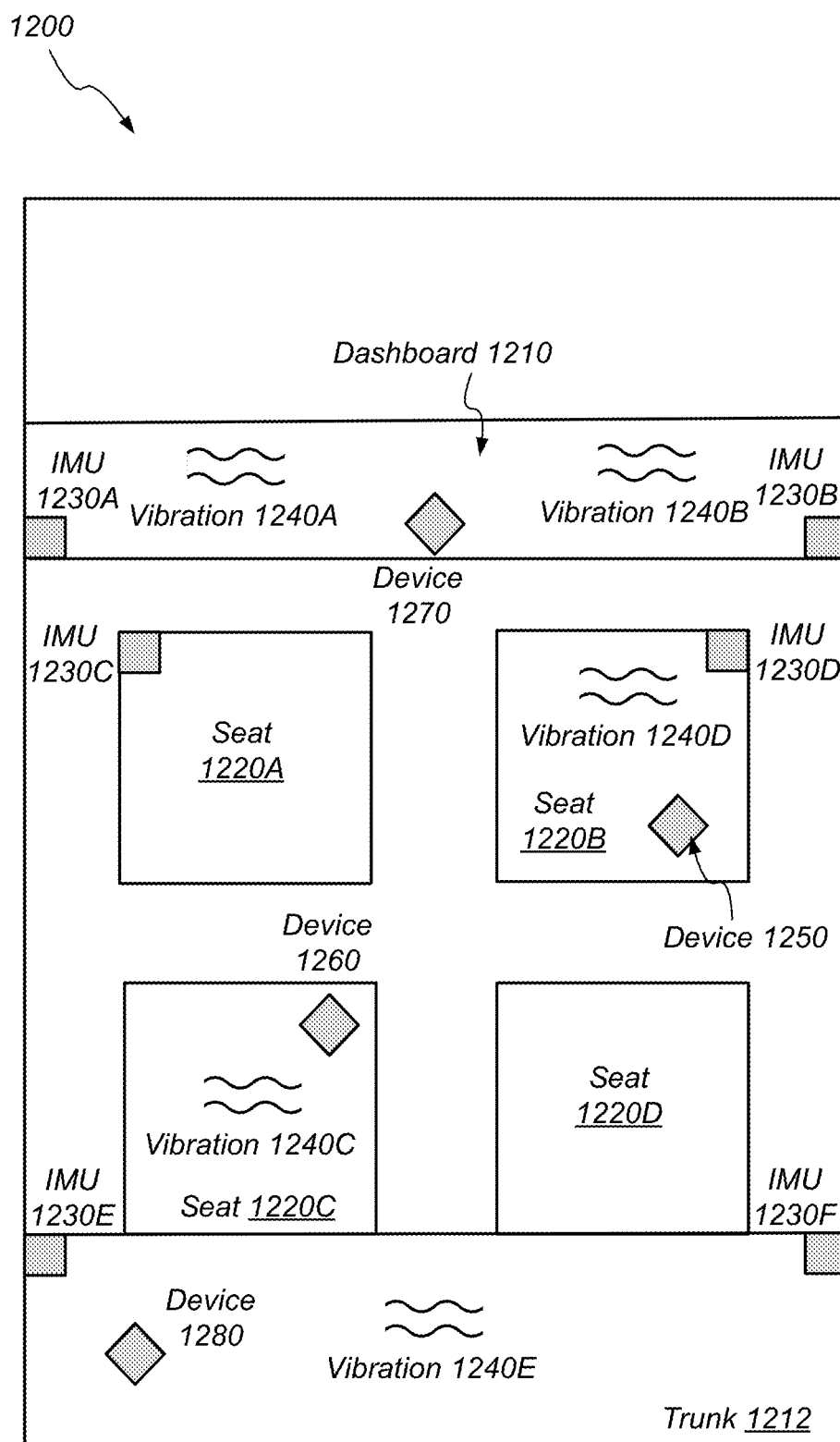
FIG. 12 illustrates a vehicle that includes a device location system using inertial measurement units, according to some embodiments.

Turning now to FIG. 12, FIG. 12 illustrates a vehicle that includes a device location system using IMUs, according to some embodiments. Vehicle 1200 includes a dashboard 1210, a trunk 1212, and seats 1220A-D. Vehicle 1200 is equipped with IMUs 1230A-E in different locations in the vehicle. As the vehicle receives external input from the road and other sources, portions in the interior of the vehicle may experience different vibrations 1240A-E. A first mobile device 1250 include a device IMU is located on seat 1220B. A second mobile device 1260 is located on seat 1220C. A third mobile device 1270 is located on the dashboard 1210. A fourth mobile device 1280 is located in the trunk 1212.

In operation, the vehicle's onboard computer may receive vibration data measured by the device IMUs. The onboard computer may attempt to match device's measured vibration with other vibrations in the vehicle's cabin, in order to locate the devices.

In the event that the device is close to a particular vehicle IMU, the onboard computer may recognize that the device IMU data closely matches the vibration of that particular IMU. Based on this, the onboard computer may determine that the mobile device is located at the location of that particular vehicle IMU. For example, in the figure, the onboard computer may determine the device 1250 is measuring vibration that closely matches vibration 1240D. Based on this, the onboard computer may determine that device 1250 is located on seat 1220B.

On the other hand, if the onboard computer determines that the vibration measured by the device IMU 1140 does not sufficiently match the vibration of any vehicle IMUs, the onboard computer may use the transfer functions to determine, using the vehicle IMU data as input, an expected vibration that different parts of the vehicle. The expected vibrations are compared with the device IMU vibration to determine if there is a close match. If so, the onboard computer may determine that the device is located at the place of the vibration match. For example, in the figure, the onboard computer may determine that device 1260 is experiencing a vibration that does not closely match any of the vibrations being measured by the vehicle IMUs 1230A-E. The onboard computer may then use the transfer functions to determine, based on the input motion that the vehicle is experiencing, that seat 1220C should be experiencing a certain expected vibration. The onboard computer may determine that the expected vibration matches closely with the vibration 1240C that is being measured by the IMU of device 1260, and conclude that device 1260 is located on the seat 1220C.

In some embodiments, where the transfer functions do not generate an expected vibration that adequately matches a measured vibration from a device, the onboard computer may simply estimate an expected vibration response by interpolating the measured vibration motion of nearby IMUs. For example, in the figure, the onboard computer may determine that device 1270 is not experiencing vibration that closely matches any of the vehicle IMUs 1230A-F, and also none of the transfer functions produce an expected vibration that closely matches the measured vibrations of device 1270. In this case, the onboard computer may interpolate the measured vibrations of all vehicle IMUs 1230A-F to create a map of interpolated vibrations in the vehicle 1200. The onboard computer may determine from this map that the vibration measured by device 1270 most closely matches an average of vibrations 1240A and 1240B, which is being detected by vehicle IMUs 1230A and 1230B, respectively. Based on this, the onboard computer may determine that device 1270 is currently located at point between IMU 1230A and 1230B, on the dashboard 1210.

In yet other embodiments, some parts of a vehicle may be specially designed to exhibit a special vibration, so that it can be easily recognized by the onboard computer. For example, vehicle 1200 may comprise a trunk 1212 that exhibits a particular vibration that is unique to the vehicle. As one possibility, the trunk may exhibit a particular rocking motion of a particular frequency given normal input vibrations. The onboard computer may recognize that device 1280 is experiencing the particular rocking motion and, based on this, determine that the device 1280 is located in the trunk 1212.

A vehicle with vehicle IMUs may use different methods in combination to locate mobile devices, or select a method to use based on the current conditions of the vehicle or a preset policy. For example, in some instances, the vehicle may detect that it is making many turning movements. In that case, the vehicle may choose to rely more on the rigid body motion function method. In another example, the vehicle may determine that it is traveling in a straight line for long periods of time. In that case, it may choose to use the vibration method of device location. In other examples, the vibration method may be used to narrow the device location down to particular section of the vehicle's interior, for example the backseats, and the rigid body motion function method may be used to pinpoint a more precise location of the device, for example in a gap between the seats' cushions.

Further, a vehicle may in some instances generate particular motions to aimed to provide location determination information to the vehicle IMUs. For example, the vehicle may be traveling on a relatively motionless path, or be stationary. To locate a device on the vehicle in this setting, the onboard computer may cause the vehicle to make a movement, so as to generate motion data for the IMUs. The movement may be generated using for example an active suspension system of the vehicle that is controllable by the onboard computer. For example, the onboard computer may cause the active suspension system to momentarily elevate a portion of the vehicle's body to generate an angular velocity. As another example, the onboard computer may provide one or more impulses to the vehicle's body to create a vibrational motion in the vehicle. As a further example, in self-navigating vehicles, the onboard computer may cause the vehicle to make small accelerations or turns to generate motion data for the IMUs. The generated motion data may be useful for both of the rigid body motion function method or the vibration motion method of device location.

Figure 13:
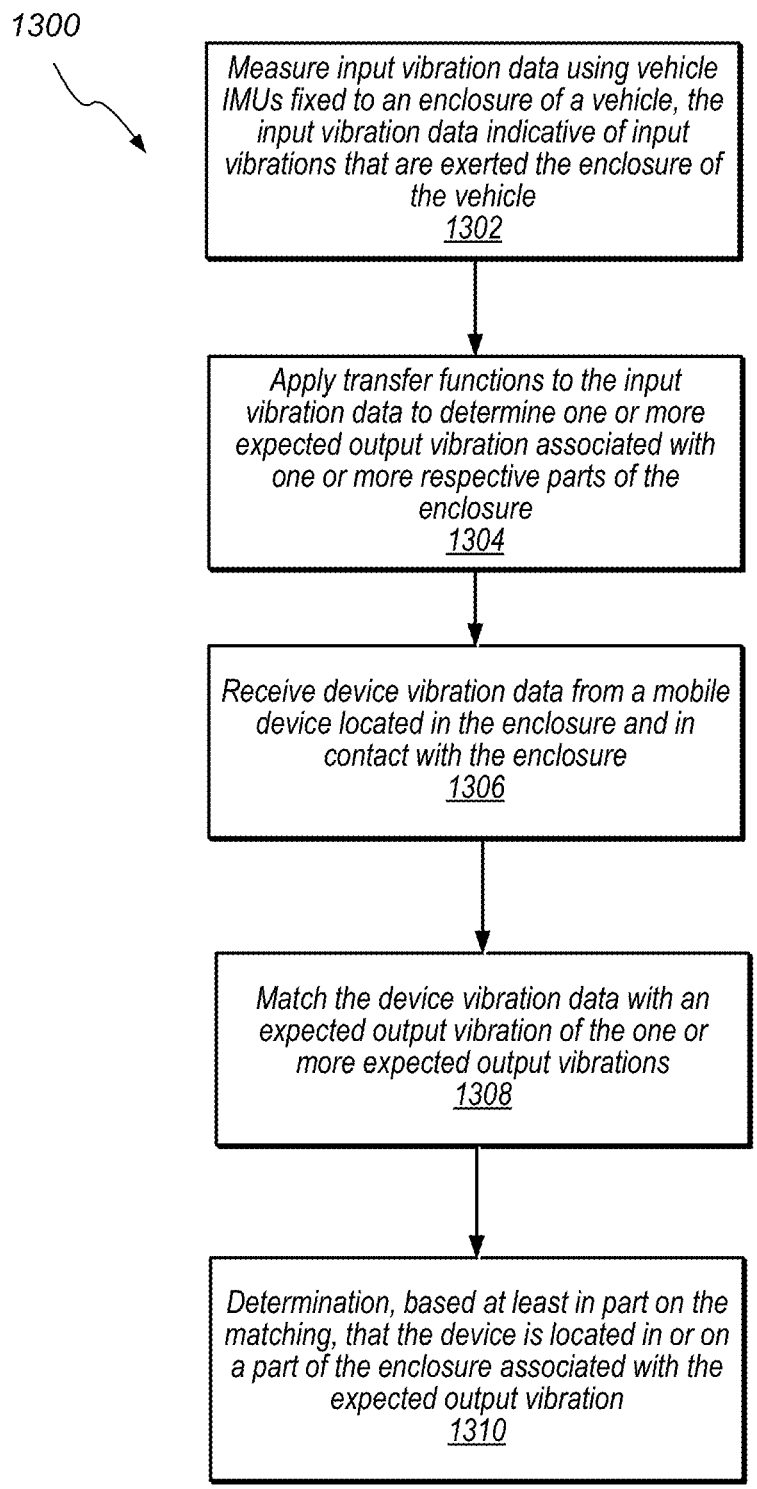
FIG. 13 is a flowchart diagram illustrating a process for determining the location of a mobile device in a device location system, according to some embodiments.

FIG. 13 is a flowchart diagram illustrating a process for determining the location of a mobile device in a device location system, according to some embodiments.

The process 1300 begins at operation 1302. In operation 1302, input vibration data is measured using one or more vehicle IMUs fixed to an enclosure of a vehicle, the input vibration data indicative of input vibrations that are exerted the enclosure of the vehicle. For example, a number of vehicle IMUs may be fixed to the suspension system of the vehicle, so that any vibrations from the road surface are detected.

In operation 1304, one or more transfer functions are applied to the input vibration data to determine one or more expected output vibration associated with one or more respective parts of the enclosure. The one or more transfer functions may comprise Laplace transforms that transform data for functions in the time domain to data for functions in the s-domain. The transfer functions may be precomputed by the vehicle's manufacturer and stored on the vehicle. The transfer functions may be calibrated based on empirical data obtained during the operation of the vehicle to account for changes in the properties of the vehicle body.

At operation 1306, device vibration data is received from a mobile device located in the enclosure and in contact with the enclosure. The device vibration data may be measured with one or more device IMU on the device. The device vibration data may be transmitted to the vehicle's onboard computer over a network connection, such as a Wifi connection.

At operation 1308, the device vibration data is matched with an expected output vibration of the one or more expected output vibrations. In order to make this matching, the device vibration data may also be transformed from the time domain to the s-domain using a Laplace transform. The matching may involve comparing the values of a plurality of data points between the expected output vibrations and the vibrations received from the device.

At operation 1310, a determination is made based at least in part on the matching that the device is located in or on a part of the enclosure associated with the expected output vibration.

Device Location Using Vehicle Cameras

Referring back to FIG. 1, the vehicle 100 may have one or more cameras 128 that may be used to determine the location of mobile devices 130. The cameras 128 may be still image cameras or video cameras. The cameras 128 may include audio recording capabilities. The cameras 128 may be programmatically turned on and off by the onboard computer 120 or mobile device 130. The vehicle cameras 128 may be located at different positions in the vehicle's cabin, to obtain visibility coverage of various areas of the vehicle cabin from various perspectives.

To determine the location of a device in the vehicle 100, the vehicle's onboard computer 120 may instruct a vehicle camera 128 to take a snapshot image of the vehicle's cabin. Images captured by the camera 128 may be analyzed by the onboard computer 120 using an image processing system configured to extract information from the images. For example, the image processing system may recognize that mobile device 130 is in the image. The image processing system may be implemented in one or more software modules operating on the onboard computer 120.

If a mobile device 130 is recognized in the image, the image processing system may determine the location of the mobile device 130 from the image. The image processing system may have knowledge of a three-dimensional model of the vehicle's cabin and be able to map particular features in the image to objects in the three-dimensional model. For example, the image processing system may recognize the contours of a passenger seat in an image, and be able to map that feature to a seat known to be in the front passenger side seat. If the image processing system determines that the recognized mobile device 130 appears inside the contours of the passenger seat, it may determine that the mobile device 130 is located on the passenger seat.

The vehicle camera can complement the other systems described above to locate mobile devices inside the vehicle. The vehicle camera can be used in situations where other systems are not useful. For example, the vehicle camera can be used when the vehicle is not moving or experiencing any vibration motion. In addition, the vehicle camera may be used even if the mobile device is turned off. On the other hand, the vehicle camera has a number of shortcoming when compared to other device location systems. For example, the camera is not useful when the mobile device is not visible in the image. Thus, if the mobile device is hidden from view (for example in the glove compartment), the vehicle camera may not be useful. Moreover, the camera may not produce the precision of other device location systems. For example, a vehicle camera may not be able to precisely determine the orientation or the pointing direction of a mobile device in the vehicle. Thus, the vehicle's onboard computer may implement a policy that uses the vehicle camera in certain situations, and other device location systems in other situations.

For example, in some embodiments, the vehicle camera may be used first, to sweep the visible areas of the vehicle for the mobile device. The camera may be also used to make a quick determination of the approximate location of the device, before the other device location systems are used. For example, the camera may make an initial determination that the mobile device is located on a back seat, and in response, the onboard computer may elect to turn on only sensors in the back side of the vehicle's cabin, to pinpoint the device's exact location.

In other embodiments, the camera may be used to aid in the operation of other device location systems. For example, as discussed above, when the signal sensors and generators are used to locate the device, it may be useful to determine whether the device has moved relative to the vehicle enclosure. The vehicle camera may be used to make this determination. For example, the video camera may be used to monitor the contents of the vehicle's cabin during the operation of the sensors. If the recognized mobile device is seen by the camera to shift positions during the operation of the sensors, the onboard computer may restart the device location session.

Figure 14:
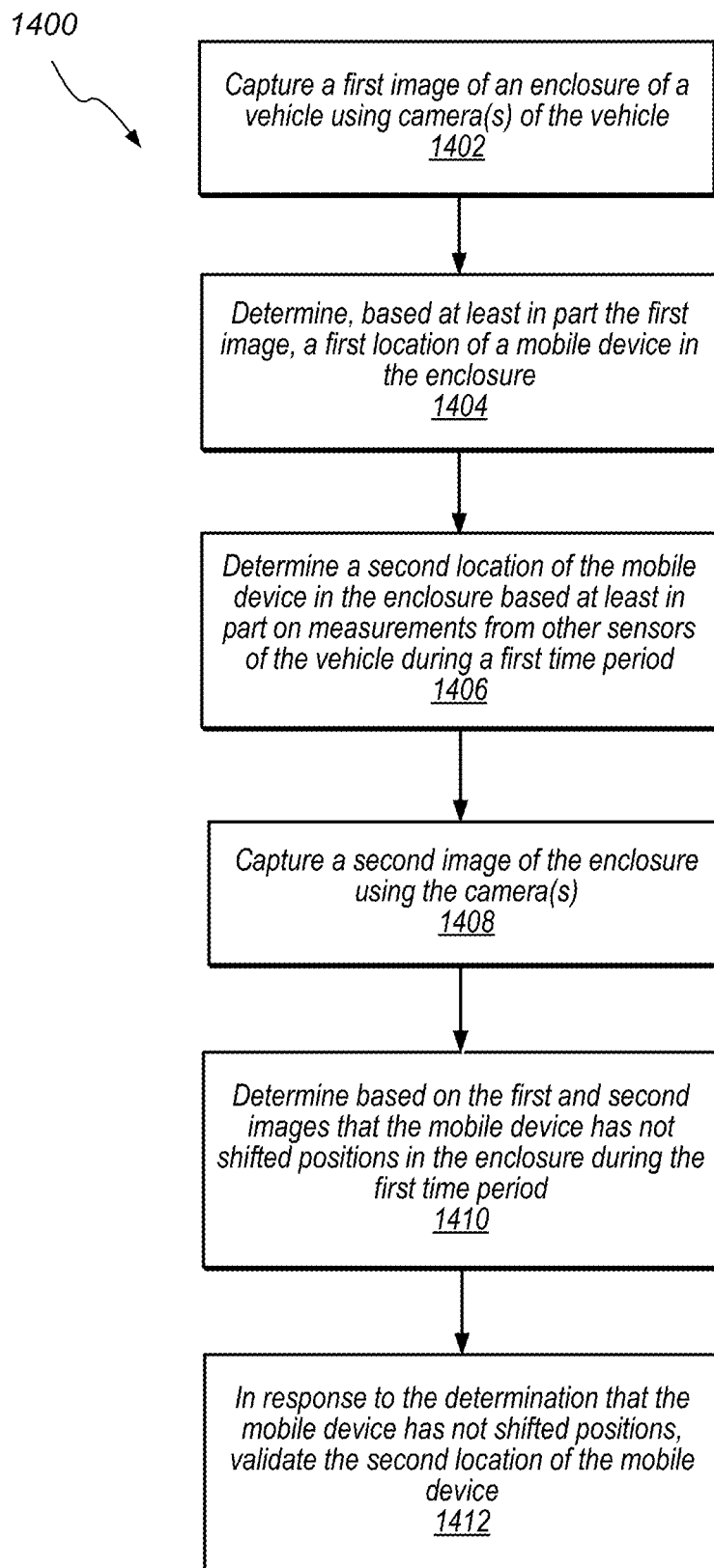
FIG. 14 is a flowchart diagram illustrating a process for determining the location of a mobile device in a device location system using a vehicle camera, according to some embodiments.

FIG. 14 is a flowchart diagram illustrating a process for determining the location of a mobile device in a device location system using one or more vehicle cameras, according to some embodiments.

The process 1400 begins at operation 1402. A first image is captured of an enclosure of a vehicle using one or more cameras of the vehicle.

At operation 1404, a determination is made based at least in part on the first image that a mobile device is located at first location in the enclosure of the vehicle. This determination may be made by an image processing system that recognizes the mobile device from the first image. The image processing system may also infer from the image the first location of the mobile device in the vehicle. The first location may be an approximate location. For example, the first location may simply be the front passenger seat of the vehicle.

At operation 1406, a determination is made of a second location of the mobile device in the enclosure, based at least in part on one or more measurements of one or more other sensors in the vehicle during a first time period. For example, the vehicle may use signal generators and/or sensors in the vehicle or IMUs in the vehicle to determine the second location. The second location may be a more precise location than the first location. For example, the second location pinpoint the mobile device to a space whose dimensions are on the order of a few centimeters. The determination may involve multiple measurements over a period of time.

At operation 1408, a second image of the enclosure is captured using the one or more cameras. The second image may be captured at the end of the process of determining the second location. Alternatively, the second image may be taken at a time during the process of determining the second location. In one embodiment, the second images may be taken in response to some condition. For example, the onboard computer may instruct the camera to take a second image after the vehicle experiences a severe jolt during the determination of the second location. In some embodiments, the camera may continually capture images to monitor the location of the mobile device throughout the process of determining the second location.

At operation 1410, a determination is made, based at least in part on the first and second images, that the mobile device has not shifted positions in the vehicle's enclosure during the first time period. During this operation, an image processing system may perform processing on the second image to determine the location of the mobile device, similar to the processing that may be performed on the first image. Thus, a location of the mobile device may be inferred from the second image. The location determined from the second image may then be compared to the location determined from the first image. Alternatively, the image processing system may simply perform a comparison of the raw data of the first and second images, and determine whether the difference between the two images indicate a movement of the mobile device.

At operation 1412, in response to the determination that the mobile device has not shifted positions, the second location of the mobile device is validated. Once the second location of the mobile device is validated, it may be used in an application by the onboard computer, or it may be reported to the user or another computer. On the other hand, if the second location of the mobile device is not validated, the onboard system may restart the location determination process using the other vehicle sensors.

Further, in some embodiments, the vehicle camera may be used to verify or calibrate other device location systems. For example, after one device location system determines a location, the onboard computer may use the vehicle camera to check that the mobile device is in fact in vicinity of the determined location, before that location is used or reported. The camera may also be used to calibrate other device location systems. For example, the onboard computer may from time to time need to learn the different vibrations that are being generated at different locations in the vehicle. This process may occur with user involvement, for example by prompting the user to place the mobile device at various places in the vehicle. Alternatively, the process may take place programmatically, by using the vehicle camera to observe the location of the mobile device during the learning process. In this way, the vehicle camera may aid in the programmatic calibration of other device location systems in the vehicle.

Applications of Device Location in a Vehicle

Once the location of a mobile device in the enclosure of the vehicle is determined, the location information may be used in a number of applications.

As one example, the device location system may be used to notify the user of the location of the mobile device in the vehicle. In one embodiment, the device may fall or slip into a place on the vehicle that is not within the user's field of view. When this happens, the user may ask the vehicle's onboard computer to locate the device. The user may perform the query using a visual user interface on a display of the vehicle, or provide a voice query to the onboard computer. The vehicle's computer may respond with a visual and audio response indication of the location of the device on the vehicle. The visual response may include an actual image of the location of the mobile device, which may be captured with a vehicle camera. In addition, the vehicle's onboard computer may cause the mobile device to generate a chirp of sound or light, or cause the mobile device to generate a ring tone, to help to user locate the device.

In another application, the vehicle may remind the user that he or she is about to leave the mobile device as the user is exiting the vehicle. For example, a taxicab may detect the location of a mobile device as the taxicab nears the end of its route. The taxicab may determine that the mobile device is not located in the passenger's hand or pocket. The taxicab may further determine that as the passenger door is opened or the passenger is getting out of his or her seat, the mobile device is not picked up. When this happens, the taxicab may alert the taxi driver and/or cause the mobile device to generate a chirp or ringtone.

In another application, the vehicle may send a message to the owner of a mobile device that was accidentally left in the vehicle. For example, a passenger on a bus may leave his or her mobile device on the bus. When the passenger realizes that he or she has lost the device, the passenger may text or email a location service provided by the bus company to determine the location of the device. If the device is turned on, an onboard computer system of the bus may interact with the lost device to determine its location on the bus. The location service may then respond to the user with the location. For example, the location service may email or text back a description of the location of the device, along with an image captured with the device of the device's surroundings. This process of locating the device may occur without any aid from personnel of the bus company.

In another exemplary application, passengers on a plane may allow their devices to be tracked by the plane's onboard computer. This may occur, for example, when the user connects to the plane's onboard Wifi network. Once location of the device is determined, the passenger's location may be tracked as the passenger moves about the cabin, enabling a number of applications. For example, the passenger may request a drink from the flight attendant using his or her device, and the flight attendant may detect that the passenger is currently seated in seat 123C on the plane. A flight attendant may determine that the plane is about to take off and detect that a passenger seated in seat 134B does not have his or her seatbelt buckled. In that event, the flight attendant may send a text to the passenger's device requesting that he or she buckle up the seatbelt. As another example, the flight attendant may detect that a device associated with a particular passenger has been inside the lavatory for an abnormally long period of time. In response, the flight attendant may politely check to see whether the passenger is still inside the lavatory, or attempt to communicate with the device to politely check on the passenger.

In another application, the location and orientation of the mobile device may be used to determine the pointing direction of the mobile device, so as to allow the device to be used as a pointer device inside the vehicle. Thus, the mobile device may be used to as a remote control for various user elements in the vehicle, such as for example the vehicle window control.

Figure 15:
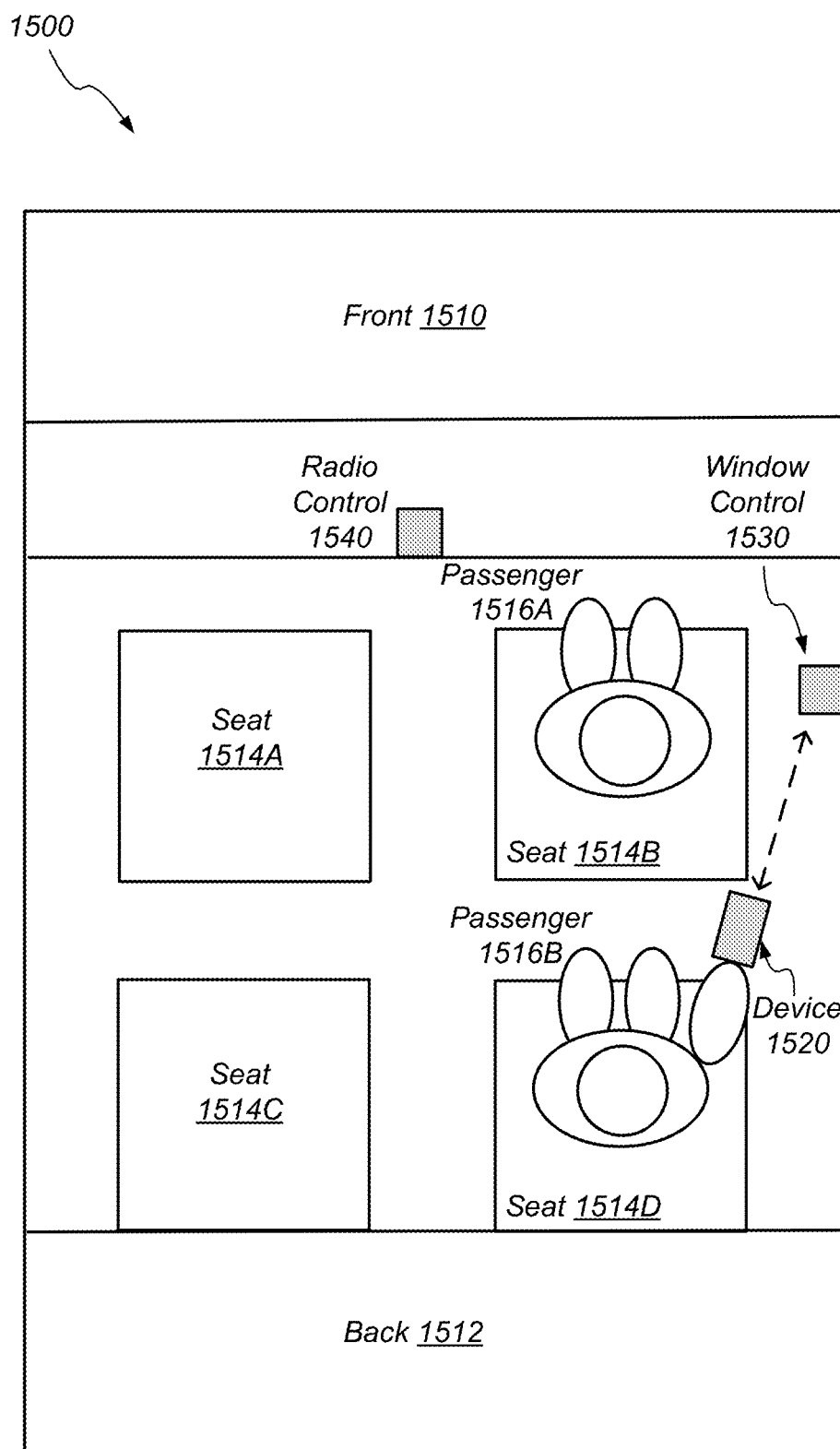
FIG. 15 illustrates a vehicle that uses a device location system to enable a mobile device to control user elements in the vehicle, according to some embodiments.

FIG. 15, for example, illustrates a vehicle that uses a device location system to enable a mobile device to control different user elements in the vehicle, according to some embodiments. FIG. 4 depicts a top view of a vehicle 1500. Vehicle 1500 includes a front 1510 and a back 1512. Vehicle 1500 also includes a plurality of seats 1514A-D. Passenger 1516A is sitting in seat 1514B, and passenger 1516B is sitting in seat 1514D. Passenger 1516B is holding mobile device 1520.

As shown, passenger 1516B is pointing the mobile device 1520 to window control 1530 of the front passenger side. Due to his or her position, passenger 1516B may not be able to physically reach window control 1530. However, passenger 1516B may be able to operate the window controlled by window control 1530 by using the mobile device 1520 as a remote control.

To use the mobile device 1520 as a remote control, the vehicle may determine the location of the mobile device 1520, and also the orientation of the mobile device 1520. These determinations may be made by one or more of the techniques for device location discussed above.

The vehicle may constantly track the location and orientation of the mobile devices in its interior. Alternatively, passenger 1516B may indicate to the vehicle that he or she wishes to use the mobile device 1520 as a pointer device or remote control. In response to receiving that indication, the vehicle may turn on a "pointer mode" on the mobile device 1520 and initiate location and/or orientation tracking of the mobile device 1520. For example, passenger may press a button on a user interface on the mobile device 1520 or provide a voice command to the mobile device 1520 to indicate that he or she wishes to place the mobile device in "pointer mode."

As passenger 1516B moves the mobile device 1520 around while the device is in pointer mode, the mobile device 1520 may display an image of the pointed-to portion of the vehicle's interior. As the mobile device 1520 points to various user elements in the vehicle's interior, the mobile device may receive information about the user elements from the vehicle's onboard computer, and display that information to passenger 1516B via a display of the mobile device 1520. For example, mobile device may indicate to passenger 1516B the various user elements that can be controlled from the mobile device 1520, such as window control 1530 or radio control 1540.

The onboard computer may also provide information about or associated with certain user elements in the vehicle. For example, as the mobile device 1520 points the radio or radio control 1540, it may receive information about the radio or radio control, for example the on/off status of the radio, the volume setting of the radio, and/or the current radio station. The mobile device 1520 may present this information to the passenger 1516B via the mobile device display. The mobile device 1520 may also present user interface elements to allow passenger 1516B to operate the radio via the mobile device 1520.

In another embodiment, the mobile device 1520 does not enter into a "pointer mode." In this embodiment, the vehicle may not determine the location and/or orientation of the mobile device 1520 until the mobile device 1520 is pointed at a target and a button is pressed. Thus, in the scenario illustrated in the figure, passenger 1520 may first point the mobile device 1520 to the window control 1530, and then press a button on the mobile device 1520 to indicate to the vehicle that he or she wishes to control the window control 1530.

After the vehicle determines the location and orientation of the mobile device 1520, the vehicle's onboard computer may compute a vector from the location and orientation to identify the target that the mobile device 1520 is pointing to. The onboard computer may maintain a coordinate system that includes the location each user element in the vehicle that is controllable by the mobile device 1520.

In some embodiments, the vehicle's onboard computer may decline a mobile device's request to control a user element. For example, the vehicle may not allow passengers in the vehicle's backseats to operate the radio or the air conditioning controls located in the front cabin, according to a user policy. In another case, the vehicle's onboard computer may not allow one passenger to control a user element when it detects that the user element is currently under the control of another passenger. In these cases, the onboard computer may send a message to the mobile computer rejecting the request, along with a reason. In other cases, the onboard computer may approve the request from the mobile device to control the user element. The onboard computer may then send a message to the mobile device 1520 to enable the mobile device 1520 to control the pointed-to user element. The message may simply be an acknowledgment that the mobile device 1520 has control of the user element.

When the mobile device 1520 is in control of a user element, a user interface may be presented to the passenger 1516B with various control elements. The user interface may include any user interfacing capabilities of the mobile device 1520, such as use of the visual display, voice commands and feedback, touch control and haptic feedback, etc.

The mobile device 1520 may control the user element via the onboard computer. For example, mobile device 1520 may communicate received user control input to the onboard computer using a network-based protocol. Moreover, the mobile device 1520 may include a software control client that includes an application programming interface (API) that allows the mobile device 1520 to make predetermined programmatic calls to particular software residing on the onboard computer. Alternatively, for certain user elements that comprise their own computers, the onboard computer may provide to the mobile device 1520 a network address of the desired user element. The mobile device 1520 may use the network address to communicate directly with the user element.

Figure 16:
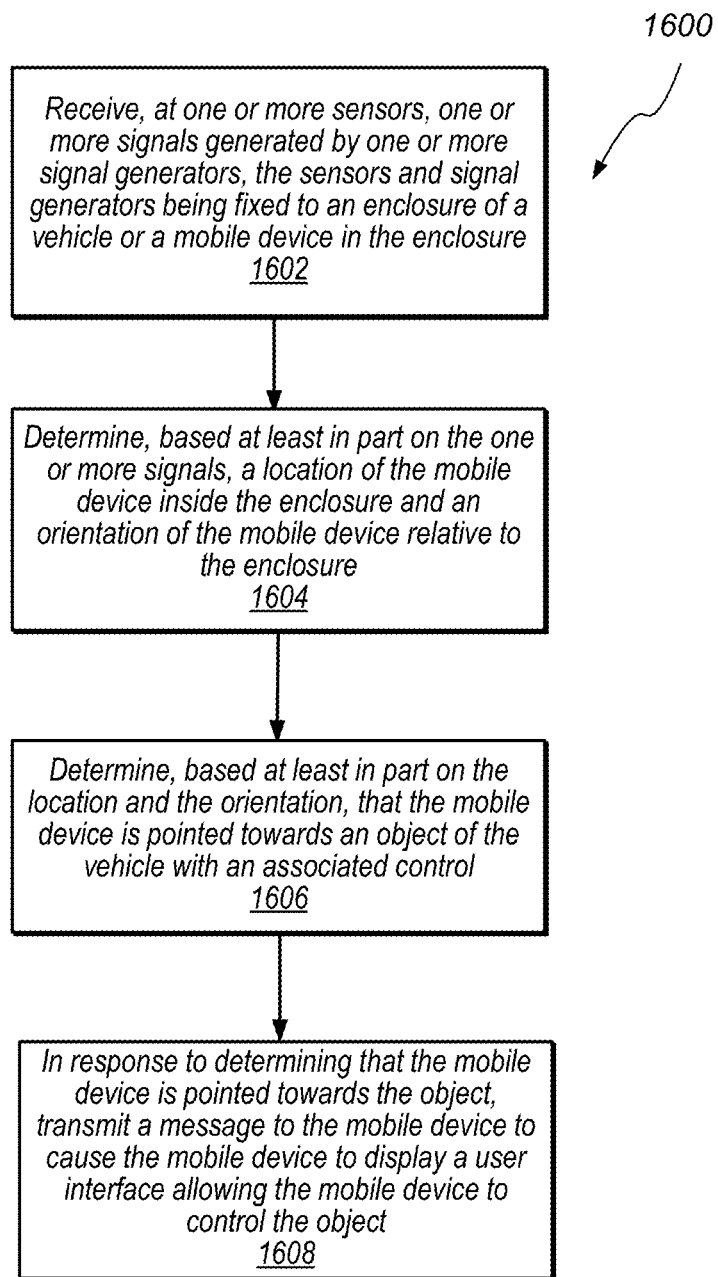
FIG. 16 is a flowchart diagram illustrating a process of obtaining control of a user element in a vehicle via a mobile device, according to some embodiments.

FIG. 16 is a flowchart diagram illustrating a process of obtaining control of a user element in a vehicle via a mobile device, according to some embodiments. The operations of process 1600 may be performed by an onboard computer of a vehicle.

Process 1600 begins with operation 1602. In operation 1602, one or more signals generated by one or more signal generators is received at one or more sensors. The sensors and signal generators are fixed to either an enclosure of a vehicle or a mobile device in the enclosure.

In operation 1604, a location of the mobile device inside the enclosure and an orientation of the mobile device relative to the enclosure are determined. These determinations are made based at least in part on the one or more signals received. These determinations may be made using any of the device location techniques discussed above.

In operation 1606, it is determined that the mobile device is pointed towards an object of the vehicle with an associate control. This determination is made based at least in part on the location and orientation of the mobile device. For example, the vehicle's onboard computer may maintain a three-dimensional coordinate system and the three-dimensional locations of all controllable user elements in the vehicle's enclosure. The location and orientation of the mobile device may be used to computer a vector in the three-dimensional coordinate system. The onboard computer may then determine from the vector what user element the mobile device is pointed to, if any.

The object may be either an element of the vehicle, such as a window, or a control for an element, for example a window control. The onboard computer may recognize both types of elements. Any object that is fixed to vehicle may be identified using this process. Such objects include but are not limited to a window, a window control, a door, a door control, a seat, a seat control, a light, a light control, a speaker, a speaker control, a radio, a radio control, an air conditioning vent, an air conditioning control, a display, or a display control.

In operation 1608, a message is transmitted to the mobile device to cause the mobile device to display a user interface allowing the mobile device to control the object. This transmission is performed in response to determining that the mobile device is pointed towards the object. The message may simply be an acknowledgment from the onboard computer that the object is under the mobile device's control. The message may include a network address associated with the object that the mobile device can use to connect to the object to communicate with the object directly.

Figure 17:
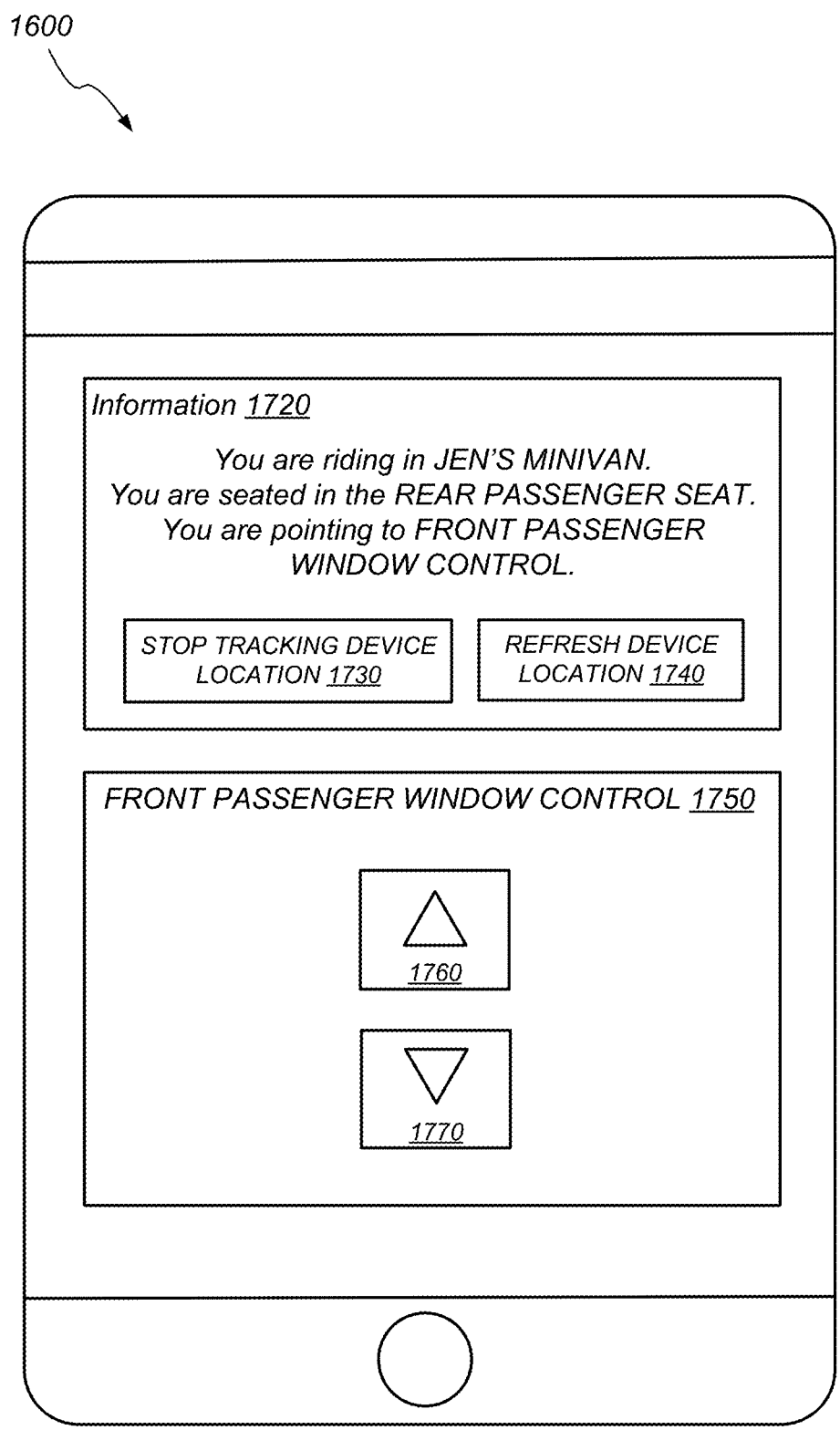
FIG. 17 illustrates a user interface on a mobile device to control a user element in a vehicle, according to some embodiments.

FIG. 17 illustrates a user interface on a mobile device to control a user element in a vehicle, according to some embodiments. FIG. 17 depicts a mobile device 1700 displaying a user interface. The user interface may be presented via software operating on the mobile device 1700. For example, the mobile device 1700 may operate a client software that interacts with server software operating on the vehicle's onboard computer. As another example, the mobile device 1700 may operate a generic web browser that interacts with a web server operating on the onboard computer. In that case, the user interface shown may be part of a web interface provided by the web server.

The user interface includes an information view 1720 that displays certain information relating to the device location system in the vehicle. The user interface also includes a bottom view that comprises a front passenger window control 1750. The front passenger window control 1750 allows the user to operate a front passenger window of the vehicle.

In the information view 1720, the user interface indicates to the passenger that he or she is currently traveling in "JEN'S MINIVAN." This information may be based on a vehicle identifier provided by the vehicle's onboard computer. The vehicle identifier may be associated with the name "JEN'S MINIVAN." The mobile device 1700 may connect to the onboard computer, for example, via a Wifi connection, to obtain this information.

The information view 1720 also indicates that the passenger is currently sitting in the "REAR PASSENGER SEAT," and that the mobile device 1700 is pointed to the "FRONT PASSENGER WINDOW CONTROL," similar to the depiction in FIG. 15. This information may be received from the onboard computer. As discussed above, the location and orientation of the mobile device 1700 in the vehicle may be determined using a variety of methods. The information shown in information view 1720 reflects the location state information currently maintained by the onboard computer, for mobile device 1700.

The information view 1720 includes a first button "STOP TRACKING DEVICE LOCATION" 1730. The mobile device 1700 may request that the vehicle continually track its location for a period of time. The button 1730 requests that the vehicle stop tracking any location data associated with mobile device 1700.

The information view 172 includes a second button "REFRESH DEVICE LOCATION" 1740. Occasionally, the vehicle's onboard computer may not have the most current data for a mobile device. This condition may be caused by a request from the device to stop tracking location data. It may also be caused by certain external conditions that causes the device location system to temporarily lose track of the mobile device. The button 1740 requests the vehicle to immediately make a determination of the current location of the mobile device 1700.

The bottom portion of the user interface 1750 may be a context sensitive view, which may change based on the object that the mobile device 1700 is pointing to. As shown, the mobile device 1700 is currently pointing to the "FRONT PASSENGER WINDOW CONTROL" of the vehicle. Thus, the bottom portion of the user interface 1750 includes a control that allows the user to control the front passenger window, using the mobile device 1700 as a remote control. The bottom portion includes an up button 1760 and a down button 1770, which may cause the front passenger window to go up and down, respectively. The buttons 1760 and 1770 may generate control messages that are transmitted to the onboard computer, which in turn operates the front passenger window accordingly.

In another application, the locations of different mobile devices in the vehicle may be used to enable interactions between the devices.

Figure 18:
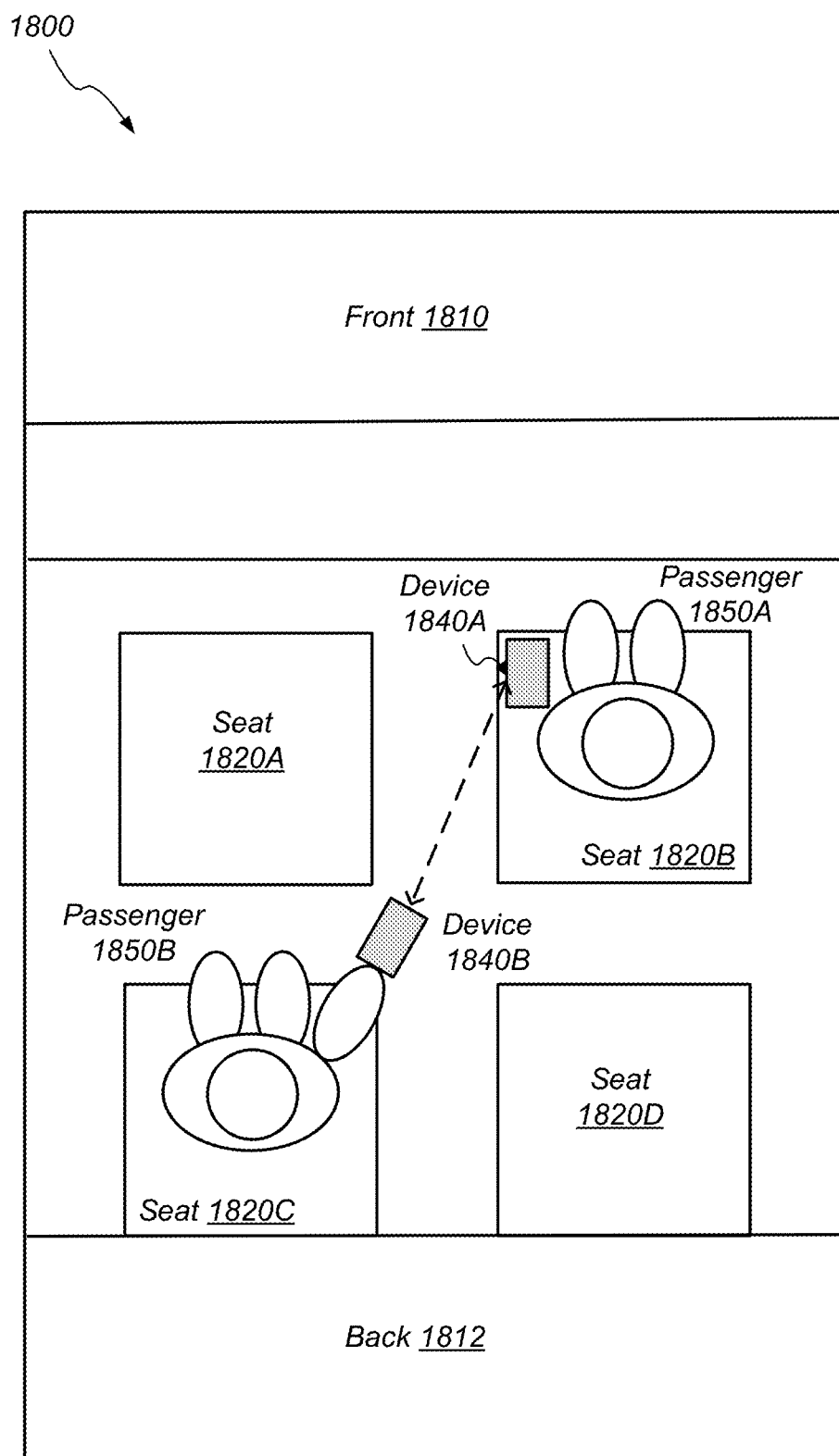
FIG. 18 illustrates a vehicle that uses a device location system to enable a mobile device to interact with a second mobile device in the vehicle, according to some embodiments.

FIG. 18 illustrates a vehicle that uses a device location system to enable a mobile device to interact with a second mobile device in the vehicle, according to some embodiments. In the figure, vehicle 1800 comprises a front 1810 and a back 1812, and four seats 1820A-D. Passenger 1850A is sitting in seat 1820B and holding device 1840A. Passenger 1850B is sitting in seat 1820C and holding device 1840B.

In operation, the vehicle 1800 may track the locations of both device 1840A and 1840B, using one or more of the device location methods discussed above. Multiple devices may be tracked in the vehicle 1800 using a type of network protocol. For example, the multiple devices, may divide up the signal space of the sensors signals used in the device location system by employing frequency division multiplexing (FDM) or time division multiplexing (TDM). In FDM, different devices may use a different frequency range to generate or sense signals. In TDM, each device may be assigned a time slice, so that the devices will take turns using the signal medium. The devices may negotiate this division of space by engaging with each other or the vehicle's onboard computer in a startup handshake process. For example, when a new device enters the vehicle, it may communicate with the other devices or the onboard computer over a Wifi network to determine how location determine may be accomplished in the vehicle.

As shown in the figure, passenger 1850B may wish to use this or her device 1840B to interact with device 1840A that is next to passenger 1850A. For example, passenger 1850B may wish to send some data such as a streaming video to passenger 1850A. As another example, passenger 1850B may wish to invite passenger 1850A to play a game using device 1840A. To initiate the interaction, passenger 1850B may hold the device 1840B so that it is pointed towards device 1840A. Passenger 1850B may additionally press a button on device 1840B or provide a voice command to device 1840B or the vehicle's onboard computer, to indicate to the vehicle's device location system that he or she is gesturing with device 1840B to interact with device 1840A.

Once the gesturing is determined by the vehicle onboard computer, the onboard computer may send messages to both devices 1840A and 1840B, which may be connected to the onboard computer via a Wifi network. The onboard computer may transmit one device's network addresses to the other, so that the two devices can make a direct network connection. Alternatively, the onboard computer of vehicle 1800 may act as a messaging server that forwards or broadcasts messages between or among the connected devices.

This type of connection-by-gesturing technique may be useful in a number of application. For example, two users in a vehicle may use the technique to connect with each other in a multiplayer card game using the players' respective devices. One player may invite a second player to join the game by gesturing towards the second player's device with his or her own device. Once connected, the players may pass cards to each other by further gesturing.

Figure 19:
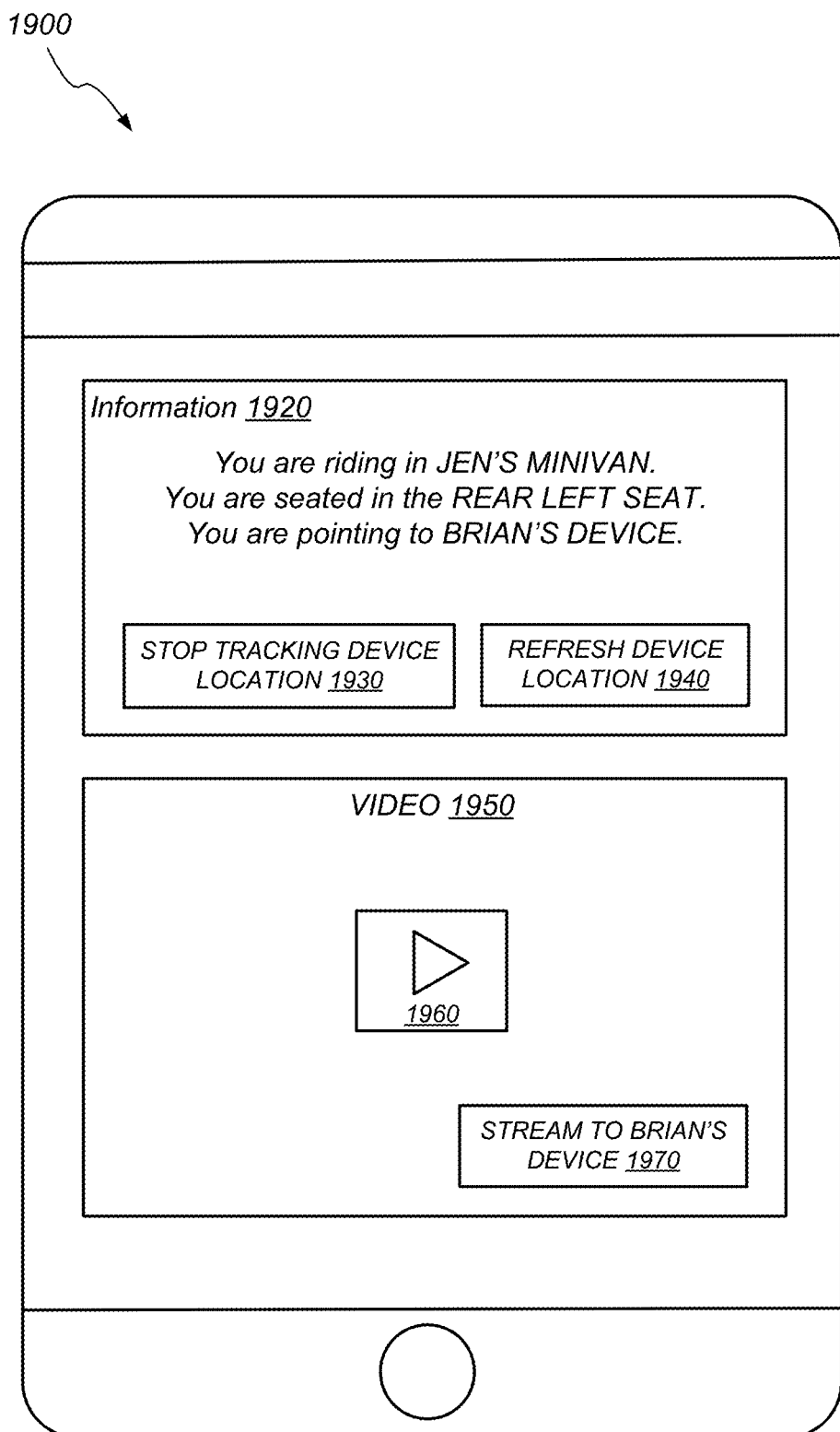
FIG. 19 illustrates a user interface on a mobile device to interact with another mobile device in a vehicle, according to some embodiments.

FIG. 19 illustrates a user interface on a mobile device to interact with another mobile device in a vehicle, according to some embodiments. FIG. 19 depicts a mobile device 1900 displaying a user interface, similar to the user interface depicted in FIG. 17.

The user interface includes an information view 1920 that displays certain information relating to the device location system in the vehicle. Information view 1920 is displaying similar information as the information view shown in FIG. 17. However, information view 1920 indicates that the mobile device 1900 is currently pointed towards "BRIAN'S DEVICE," which may be another device located in the vehicle. For example, each device in the vehicle may register a name for the device to be used for display purposes. The determination that device 1900 is pointing to "BRIAN'S DEVICE" is made with the aid of the device location system in the vehicle, which may be tracking the locations of both mobile device 1900 and "BRIAN'S DEVICE."

The bottom portion of the user interface 1950 is a user interface to play a video. User interface 1950 includes controls such as control 1960 to play or pause the video, for example. User interface 1950 includes a button 1970 to "STREAM TO BRIAN'S DEVICE." This button may issue a request to "BRIAN'S DEVICE" to stream the video to his device. If 'BRIAN'S DEVICE" approves the interaction, mobile device 1900 may cause the video to be streamed to "BRIAN' S DEVICE."

The message communications between the two devices and the streaming of the video may occur over a direct network connection between the two devices. The vehicle's onboard computer may provide the connection information such as device network addresses to the two devices to enable the connection. Alternatively, the vehicle's onboard computer may act as a messaging service between the devices, and forward or broadcast any messages between or among the devices as requested.

Thus, the bottom portion of the user interface 1750 includes a control that allows the user to control the front passenger window, using the mobile device 1700 as a remote control. The bottom portion includes an up button 1760 and a down button 1770, which may cause the front passenger window to go up and down, respectively. The buttons 1760 and 1770 may generate control messages that are transmitted to the onboard computer, which in turn operates the front passenger window accordingly.

Figure 20:
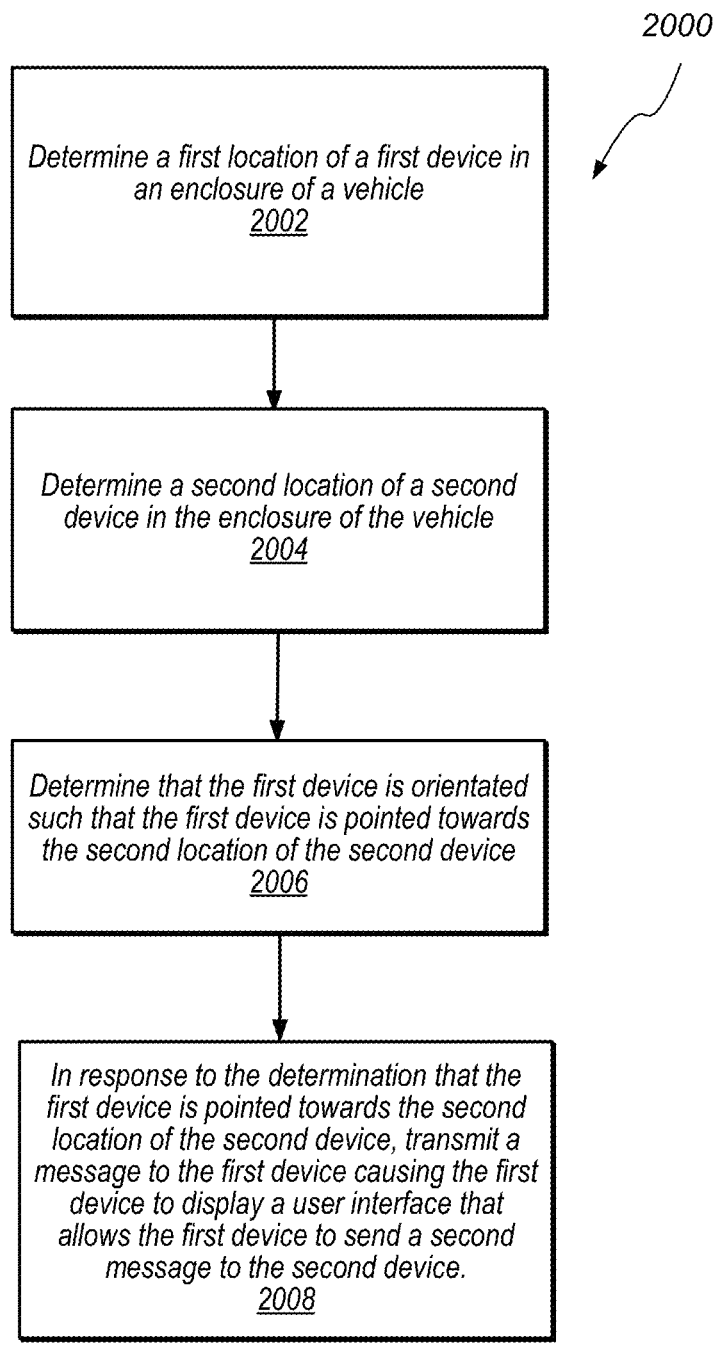
FIG. 20 is a flowchart diagram illustrating a process of initiating an interaction between two mobile devices in a vehicle, according to some embodiments.

FIG. 20 is a flowchart diagram illustrating a process of initiating an interaction between two mobile devices in a vehicle, according to some embodiments.

The process 2000 begins at operation 2002. At operation 2002, a determination is made of a first location of a first device in an enclosure of a vehicle. In operation 2004, a determination is made of a second location of a second device in the enclosure of the vehicle. The determinations of the first and second locations may be made using any combination of device location techniques described above.

At operation 2006, a determination is made that the first device is orientated such that it is pointed towards the second location of the second device. The determination of the first device's orientation and its pointed-to target may be made by any combination of device location techniques described above.

At operation 2008, in response to the determination that the first device is pointed towards the second location of the second device, a message is transmitted to the first device causing the first device to display a user interface that allows the first device to send a second message to the second device. This operation may be accomplished by the vehicle's onboard computer, which may detect that the first device is gesturing to interact with the second device by pointing at the second device. In response, the onboard computer may transmit a message to the first device, indicating that the vehicle has recognized the gesture from the first device. The message may also include connection information such as the network address of the second device, which may be used by the first device to establish a direct connection with the second device. The onboard computer may alert the second device prior to sending the message to the first device, to verify that the second device's user approves of the requested interaction.

In yet another application, the location information of the device may be used to create a tiled display, in which multiple smaller displays are combined to form a larger display. In this application, the relative locations of the tile displays may be determined. The relative locations are used by a controller of the overall display to divide up the display signals to be transmitted each of the tile displays.

Figure 21:
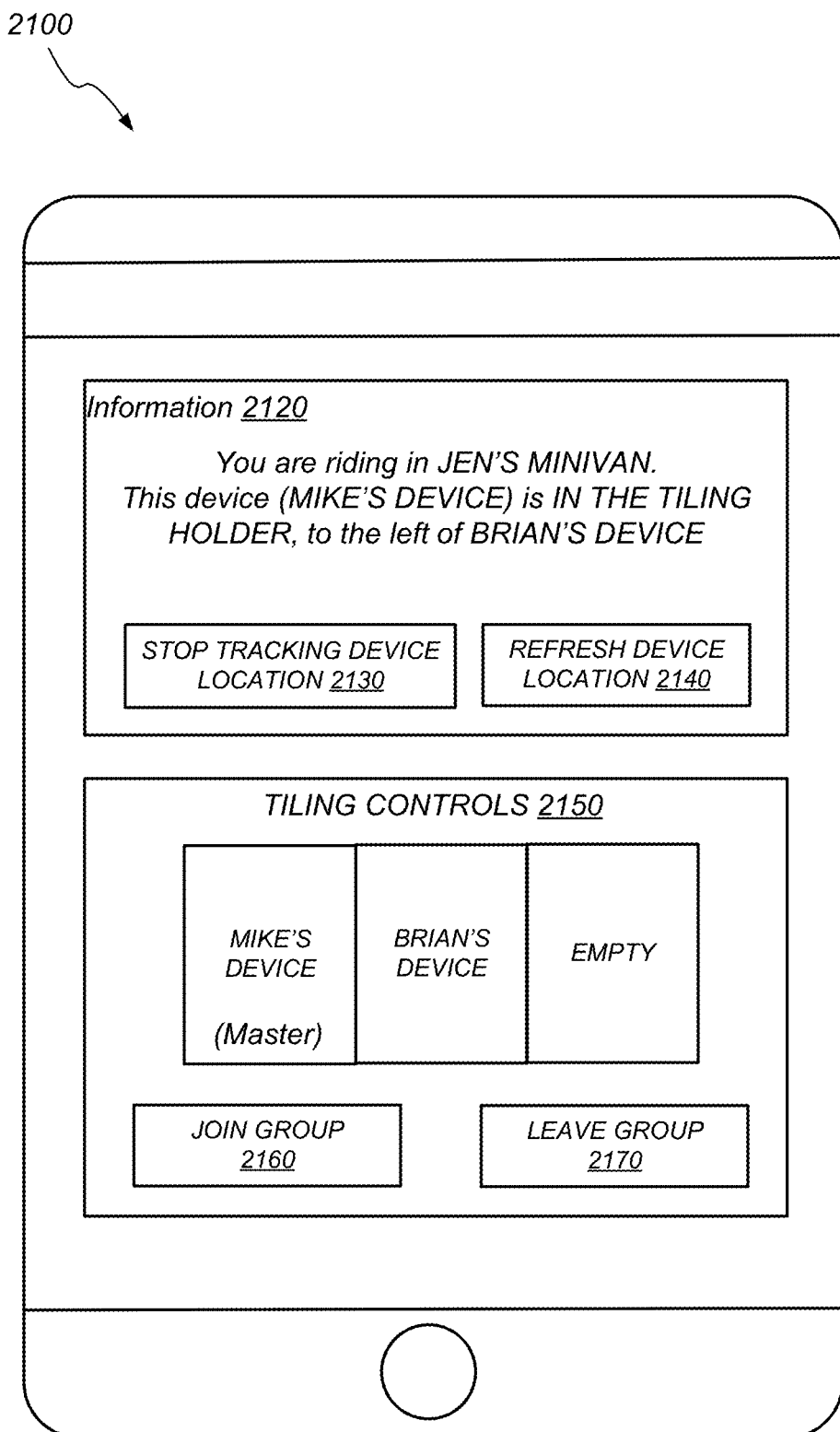
FIG. 21 illustrates a user interface on a mobile device to join a tiled display, according to some embodiments.

FIG. 21 illustrates a user interface on a mobile device to join a tiled display, according to some embodiments. FIG. 21 depicts a mobile device 2100 displaying a user interface, similar to the user interface depicted in FIG. 17 and FIG. 19.

The user interface includes an information view 2120 that displays certain information relating to the device location system in the vehicle. Information view 2120 is displaying similar information as the information views shown in FIG. 17 and FIG. 19. However, information view 2120 indicates that the mobile device 2100 currently resides in a tiling holder, and that it is located to the left of "BRIAN'S DEVICE" in the tiling holder. The determination that device 2100 is located to the left of "BRIAN'S DEVICE" may be made programmatically with the aid of the device location system in the vehicle, which may be tracking the locations of multiple mobile devices in the vehicle.

The tiling holder may be just a simple mechanical holder that relies on the vehicle's device location system to determine the device's locations. Alternatively, the tiling holder may be a computer that implements its own device location system based on its own sensors. In another embodiment, the tiling holder employs sensors that are in communication with the vehicle's onboard computer. The tiling holder may provide other facilities to create a maintain a tiled display. For example, the tiling holder may include a video controller that receives a video input and processes that input to be separately transmitted to the individual tiles.

In the figure, the bottom portion of the user interface 2150 is a "TILING CONTROLS" user interface that may be used to create a tiled display. The user interface 2150 includes a view of the displays that are currently in the tiling holder, including "MIKE'S DEVICE" and "BRIAN'S DEVICE." This view may be generated based on the location information provided by the vehicle's onboard computer. The user interface also indicates that "MIKE'S DEVICE" is currently the "Master" device. In some embodiments, the tiling display may allow one device to control the entire tiled display, thus acting as the master of the tiling group. The user interface 2150 may allow for touch control, such that by touching one tile in the view of the tiling holder, that tile is made the "Master" of the group. The control 2150 also includes two buttons "JOIN GROUP" 2160 and "LEAVE GROUP" 2170. These buttons may invoke respective functions that cause the device 2100 to join or leave the tiling group.

Figure 22:
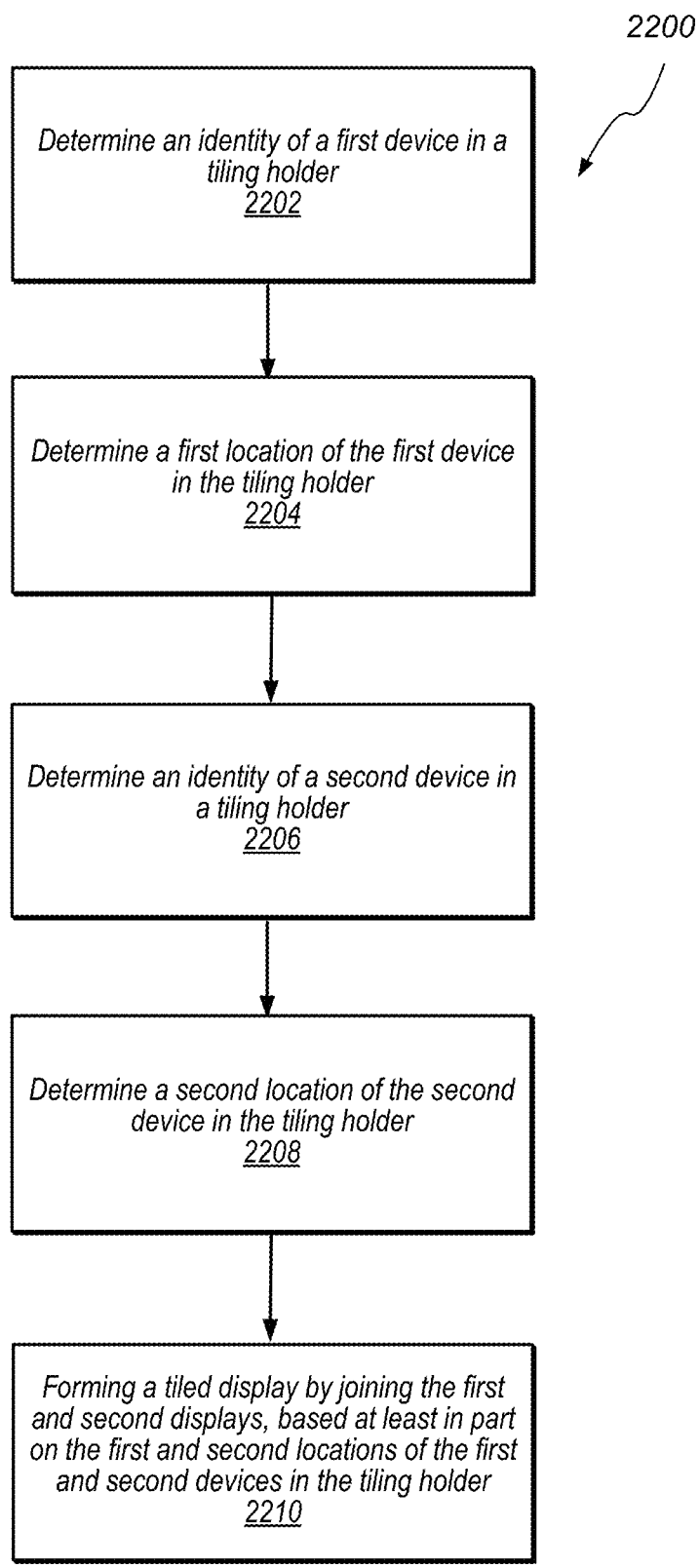
FIG. 22 is a flowchart diagram illustrating a process of forming a tiled display, according to some embodiments.

FIG. 22 is a flowchart diagram illustrating a process of forming a tiled display, according to some embodiments.

Process 2200 begins at operation 2202. At operation 2202, an identity of a first device in a tiling holder is determined. The identity of the first device may be determined by registering the first device with the tiling holder under a device name, for example, "MIKE'S DEVICE." The tiling holder may include a computer that manages the registry of devices. Alternatively, the registration may occur with the vehicle's onboard computer.

In one embodiment, the tiling holder may be a fixture in the vehicle cabin. When a user places his or her device in the tiling holder, the vehicle onboard computer and/or tiling holder may initiate a process to create a tiled display. The onboard computer or tiling holder may create a tiling group and add the device's registered name or identifier to the tiling group.

At operation 2204, a first location of the first device in the tiling holder is determined. The first location may be determined by made by any combination of device location techniques described above. In some embodiments, the tiling holder may contain its own sensors such as signal sensors or IMUs.

At operation 2206, an identity of a second device in a tiling holder is determined. Operation 2206 may be carried out in a similar manner as operation 2202.

At operation 2208, a second location of the second device in the tiling holder is determined. Operation 2208 may be carried out in a similar manner as operation 2204.

At operation 2210, a tiled display is formed by joining the first and second displays, based at least in part on the first and second locations of the first and second devices in the tiled holder. For example, a computer acting as the controller of the tiled display, for example a computer that is part of the tiling holder, the vehicle's onboard computer, or one of the devices, may determine how a display signal for the tiled display should be divided among the devices that form the tiling group, including the first and second display. This determined is based on the relative locations of the first and second devices in the tiling holder.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
   determining an identity of a first device in a tiling holder;
   determining a first location of the first device in the tiling holder;
   determining an identity of a second device in a tiling holder;
   determining a second location of the second device in the tiling holder; and
   based at least in part on the first location of the first device and the second location of the second device in the tiling holder, joining a first display of the first device and the second display of the second device to form a tiled display.

2. The method of claim 1, wherein:
   the tiling holder is located within an enclosure of a vehicle;
   the first and second devices are mobile devices; and
   the first and second locations are determined based at least in part on one or more location sensors in the enclosure of the vehicle.

3. The method of claim 1, further comprising:
   after the formation of the tiled display:
   receiving, by the tiling holder, a video signal for the tiled display;
   separating the video signal into a first video signal for the first display and a second video signal for the second display;
   transmitting the first video signal to the first device; and
   transmitting the second video signal to the second device.

4. The method of claim 1, further comprising:
   causing the first device to display a user interface on the first display, wherein the user interface indicates the identities of the first device and the second devices, the first location of the first device, and the second location of the second device.

5. The method of claim 4, wherein:
   the first and second devices are located within an enclosure of a vehicle; and
   the method includes causing the user interface to display a name of the vehicle.

6. The method of claim 4, further comprising:
   receiving, via the user interface, user input instructing the first device to join a group of devices to form the tiled display; and
   in response to the user input, causing the first device to join the group of devices.

7. The method of claim 6, further comprising:
   receiving, via the user interface, further user input instructing the first device to leave the group of devices that form the tiled display; and
   in response to the further user input, causing the first device to join the group of devices.

8. The method of claim 4, further comprising:
   receiving, via the user interface, user input instructing one or more location sensors to stop tracking the first location of the first device.

9. The method of claim 4, further comprising:
   receiving, via the user interface, user input instructing one or more location sensors to refresh the first location of the first device.

10. The method of claim 4, wherein:
    the first device is located within an enclosure;
    the first location of the first device is determined via one or more sensors on the first device and one or more signal generators in the enclosure; and
    the one or more sensors are configured to detect a signal generated by one or more signal generators.

11. The method of claim 10, wherein the signal is one of an infrared (IR) signal, a Wifi band signal, and a Bluetooth band signal.

12. The method of claim 1, wherein the tiled display is formed based at least in part on a detected orientation of the first device.

13. A system, comprising:
one or more sensors configured to detect locations of mobile devices in an enclosure;
a computer in communication with the one or more sensors, the computer configured to:
determine an identity of a first device in a tiling holder in the enclosure;
determine a first location of the first device in the tiling holder;
determine an identity of a second device in a tiling holder;
determine a second location of the second device in the tiling holder; and
based at least in part on the first location of the first device and the second location of the second device in the tiling holder, join a first display of the first device and the second display of the second device to form a tiled display.

14. The system of claim 13, wherein the computer is configured to:
after the formation of the tiled display:
receive a video signal for the tiled display;
separate the video signal into a first video signal for the first display and a second video signal for the second display;
transmit the first video signal to the first device; and
transmit the second video signal to the second device.

15. The system of claim 14, wherein the computer is configured to:
cause the first device to display a user interface on the first display, wherein the user interface indicates the identities of the first device and the second devices, the first location of the first device, and the second location of the second device.

16. The system of claim 13, wherein:
the one or more sensors are configured to determine the location of the first device based at least in part on a signal generated by one or more signal generators in the enclosure.

17. The system of claim 16, wherein the signal is one of an infrared (IR) signal, a Wifi band signal, and a Bluetooth band signal.

18. The system of claim 16, wherein the signal includes an acoustic signal.

19. The system of claim 13, wherein the enclosure comprises an interior of a vehicle.

20. The system of claim 13, wherein the computer configured to control an object in the enclosure based at least in part on a determined location and orientation of the first device and user input received via the first device, wherein the object is one of a window, a window control, a door, a door control, a seat, a seat control, a light, a light control, a speaker, a speaker control, a radio, a radio control, an air conditioning vent, an air conditioning control, a display, and a display control.

* * * * *